US008332406B2

(12) United States Patent
Donaldson

(10) Patent No.: US 8,332,406 B2
(45) Date of Patent: Dec. 11, 2012

(54) REAL-TIME VISUALIZATION OF USER CONSUMPTION OF MEDIA ITEMS

(75) Inventor: Justin Donaldson, Corvallis, OR (US)

(73) Assignee: Apple Inc., Cupertino, CA (US)

( * ) Notice: Subject to any disclaimer, the term of this patent is extended or adjusted under 35 U.S.C. 154(b) by 353 days.

(21) Appl. No.: 12/572,984

(22) Filed: Oct. 2, 2009

(65) Prior Publication Data

US 2010/0088273 A1    Apr. 8, 2010

Related U.S. Application Data

(60) Provisional application No. 61/102,199, filed on Oct. 2, 2008.

(51) Int. Cl.
*G06F 17/30* (2006.01)
(52) U.S. Cl. ......... 707/736; 707/758; 707/776; 707/913
(58) Field of Classification Search .................. 707/609, 707/802, 711, 736, 754, 758, 776, 913
See application file for complete search history.

(56) References Cited

U.S. PATENT DOCUMENTS

| | | |
|---|---|---|
| 5,355,302 A | 10/1994 | Martin |
| 5,375,235 A | 12/1994 | Berry et al. |
| 5,464,946 A | 11/1995 | Lewis |
| 5,483,278 A | 1/1996 | Strubbe |
| 5,583,763 A | 12/1996 | Atcheson et al. |
| 5,724,521 A | 3/1998 | Dedrick |
| 5,754,939 A | 5/1998 | Herz |
| 5,758,257 A | 5/1998 | Herz |
| 5,890,152 A | 3/1999 | Rapaport |
| 5,918,014 A | 6/1999 | Robinson |
| 5,950,176 A | 9/1999 | Keiser |
| 5,963,746 A | 10/1999 | Barker |
| 6,000,044 A | 12/1999 | Chrysos et al. |
| 6,047,311 A | 4/2000 | Ueno et al. |
| 6,112,186 A | 8/2000 | Bergh et al. |
| 6,134,532 A | 10/2000 | Lazarus et al. |
| 6,345,288 B1 | 2/2002 | Reed |
| 6,346,951 B1 | 2/2002 | Mastronardi |
| 6,347,313 B1 | 2/2002 | Ma |

(Continued)

FOREIGN PATENT DOCUMENTS

EP    1231788    8/2002

(Continued)

OTHER PUBLICATIONS

Notess, Mark et al., Variations2: Toward Visual Interfaces for Digital Music Libraries, Second International Worshop on Visual Interfaces to Digital Libraries, 2002, 6 pages.

(Continued)

*Primary Examiner* — Christyann Pulliam
*Assistant Examiner* — Rezwanul Mahmood

(57) ABSTRACT

A computer implemented method for displaying real-time computer mediated user consumption data, comprising: accessing consumption data corresponding to real-time computer mediated user consumption behavior; parsing the consumption data to identify one or more events comprising one or more instances of consumption data and wherein each event is associated with a user; adding the events to an event stack comprising a predetermined stack limit; and storing the consumption data for each event in a data structure configured to correlate related consumption data and provide a temporal context to the stored consumption data wherein addition of graphical symbols to a visualization display is responsive to the arrangement of the consumption data in the data structure.

10 Claims, 14 Drawing Sheets

U.S. PATENT DOCUMENTS

| | | |
|---|---|---|
| 6,349,339 B1 | 2/2002 | Williams |
| 6,381,575 B1 | 4/2002 | Martin et al. |
| 6,430,539 B1 | 8/2002 | Lazarus et al. |
| 6,434,621 B1 | 8/2002 | Pezzillo |
| 6,438,579 B1 | 8/2002 | Hosken |
| 6,487,539 B1 | 11/2002 | Aggarwal et al. |
| 6,505,046 B1 | 1/2003 | Baker |
| 6,526,411 B1 | 2/2003 | Ward |
| 6,532,469 B1 | 3/2003 | Feldman et al. |
| 6,577,716 B1 | 6/2003 | Minter |
| 6,587,127 B1 | 7/2003 | Leeke et al. |
| 6,615,208 B1 | 9/2003 | Behrens et al. |
| 6,647,371 B2 | 11/2003 | Shinohara |
| 6,687,696 B2 | 2/2004 | Hofmann et al. |
| 6,690,918 B2 | 2/2004 | Evans et al. |
| 6,751,574 B2 | 6/2004 | Shinohara |
| 6,785,688 B2 | 8/2004 | Abajian et al. |
| 6,842,761 B2 | 1/2005 | Diamond et al. |
| 6,850,252 B1 | 2/2005 | Hoffberg |
| 6,914,891 B2 | 7/2005 | Ha et al. |
| 6,931,454 B2 | 8/2005 | Deshpande et al. |
| 6,938,209 B2 | 8/2005 | Ogawa |
| 6,947,922 B1 | 9/2005 | Glance |
| 6,950,804 B2 | 9/2005 | Strietzel |
| 6,987,221 B2 | 1/2006 | Platt |
| 6,990,497 B2 | 1/2006 | O'Rourke et al. |
| 6,993,532 B1 | 1/2006 | Platt et al. |
| 7,020,637 B2 | 3/2006 | Bratton |
| 7,021,836 B2 | 4/2006 | Anderson |
| 7,051,352 B1 | 5/2006 | Schaffer |
| 7,072,846 B1 | 7/2006 | Robinson |
| 7,082,407 B1 | 7/2006 | Bezos et al. |
| 7,085,845 B2 * | 8/2006 | Woodward et al. ........... 709/231 |
| 7,096,234 B2 | 8/2006 | Plastina |
| 7,111,240 B2 | 9/2006 | Crow |
| 7,120,619 B2 | 10/2006 | Drucker |
| 7,127,143 B2 | 10/2006 | Elkins, II et al. |
| 7,136,866 B2 | 11/2006 | Springer, Jr. |
| 7,139,723 B2 | 11/2006 | Conkwright |
| 7,174,126 B2 | 2/2007 | McElahtten |
| 7,180,473 B2 | 2/2007 | Horie |
| 7,194,421 B2 | 3/2007 | Conkwright |
| 7,197,472 B2 | 3/2007 | Conkwright |
| 7,224,282 B2 | 5/2007 | Terauchi |
| 7,236,941 B2 | 6/2007 | Conkwright |
| 7,256,341 B2 | 8/2007 | Plastina |
| 7,302,419 B2 | 11/2007 | Conkwright |
| 7,302,468 B2 | 11/2007 | Wijeratne |
| 7,358,434 B2 | 4/2008 | Plastina |
| 7,363,314 B2 | 4/2008 | Picker et al. |
| 7,392,212 B2 | 6/2008 | Hancock |
| 7,403,769 B2 | 7/2008 | Kopra |
| 7,415,181 B2 | 8/2008 | Greenwood |
| 7,457,862 B2 | 11/2008 | Hepworth et al. |
| 7,478,323 B2 | 1/2009 | Dowdy |
| 7,487,107 B2 | 2/2009 | Blanchard et al. |
| 7,493,572 B2 | 2/2009 | Card et al. |
| 7,499,630 B2 | 3/2009 | Koch et al. |
| 7,505,959 B2 | 3/2009 | Kaiser et al. |
| 7,546,254 B2 | 6/2009 | Bednarek |
| 7,568,213 B2 | 7/2009 | Carhart et al. |
| 7,571,121 B2 | 8/2009 | Bezos |
| 7,574,422 B2 | 8/2009 | Guan et al. |
| 7,574,434 B2 | 8/2009 | Galuten |
| 7,574,513 B2 | 8/2009 | Dunning et al. |
| 7,580,932 B2 | 8/2009 | Plastina et al. |
| 7,712,113 B2 * | 5/2010 | Yoon et al. .................. 725/9 |
| 2001/0056434 A1 | 12/2001 | Kaplan et al. |
| 2002/0002899 A1 | 1/2002 | Gjerdingen |
| 2002/0059094 A1 | 5/2002 | Hosea et al. |
| 2002/0082901 A1 * | 6/2002 | Dunning et al. ................ 705/10 |
| 2002/0152117 A1 | 10/2002 | Christofalo et al. |
| 2002/0178223 A1 | 11/2002 | Bushkin |
| 2002/0194215 A1 | 12/2002 | Cantrell et al. |
| 2003/0022953 A1 | 1/2003 | Zampini et al. |
| 2003/0033321 A1 | 2/2003 | Schrempp et al. |
| 2003/0055689 A1 | 3/2003 | Block |
| 2003/0120630 A1 | 6/2003 | Tunkelang |
| 2003/0182254 A1 | 9/2003 | Plastina et al. |
| 2003/0182315 A1 | 9/2003 | Plastina et al. |
| 2003/0204620 A1 * | 10/2003 | Cheng .......................... 709/238 |
| 2003/0212710 A1 | 11/2003 | Guy |
| 2003/0229537 A1 * | 12/2003 | Dunning et al. ................ 705/10 |
| 2004/0003392 A1 | 1/2004 | Trajkovic et al. |
| 2004/0068552 A1 | 4/2004 | Kotz et al. |
| 2004/0073924 A1 | 4/2004 | Pendakur |
| 2004/0128286 A1 | 7/2004 | Yasushi et al. |
| 2004/0139064 A1 | 7/2004 | Chevallier |
| 2004/0263337 A1 | 12/2004 | Terauchi et al. |
| 2004/0267715 A1 | 12/2004 | Polson et al. |
| 2005/0005246 A1 | 1/2005 | Card et al. |
| 2005/0021470 A1 | 1/2005 | Martin et al. |
| 2005/0060350 A1 | 3/2005 | Baum |
| 2005/0075908 A1 | 4/2005 | Stevens |
| 2005/0091146 A1 | 4/2005 | Levinson |
| 2005/0102610 A1 | 5/2005 | Jie |
| 2005/0114357 A1 | 5/2005 | Chengalvarayan et al. |
| 2005/0141709 A1 | 6/2005 | Bratton |
| 2005/0154608 A1 | 7/2005 | Paulson et al. |
| 2005/0180330 A1 * | 8/2005 | Shapiro ........................ 370/241 |
| 2005/0193014 A1 | 9/2005 | Prince |
| 2005/0193054 A1 | 9/2005 | Wilson et al. |
| 2005/0195696 A1 | 9/2005 | Rekimoto |
| 2005/0198075 A1 | 9/2005 | Plastina et al. |
| 2005/0203807 A1 | 9/2005 | Bezos et al. |
| 2005/0210101 A1 | 9/2005 | Janik |
| 2005/0216855 A1 | 9/2005 | Kopra et al. |
| 2005/0223039 A1 | 10/2005 | Kim et al. |
| 2005/0235811 A1 | 10/2005 | Dukane |
| 2005/0256867 A1 | 11/2005 | Walther et al. |
| 2005/0276570 A1 | 12/2005 | Reed et al. |
| 2006/0015571 A1 | 1/2006 | Fukuda et al. |
| 2006/0015904 A1 | 1/2006 | Marcus |
| 2006/0018208 A1 | 1/2006 | Nathan et al. |
| 2006/0018209 A1 | 1/2006 | Drakoulis et al. |
| 2006/0020062 A1 | 1/2006 | Bloom |
| 2006/0020662 A1 | 1/2006 | Robinson |
| 2006/0026263 A1 | 2/2006 | Raghavan et al. |
| 2006/0053077 A1 | 3/2006 | Mourad |
| 2006/0062094 A1 | 3/2006 | Nathan et al. |
| 2006/0067296 A1 | 3/2006 | Bershad |
| 2006/0074750 A1 | 4/2006 | Clark et al. |
| 2006/0080356 A1 * | 4/2006 | Burges et al. ............. 707/103 R |
| 2006/0095516 A1 | 5/2006 | Wijeratne |
| 2006/0100978 A1 | 5/2006 | Heller |
| 2006/0112098 A1 * | 5/2006 | Renshaw et al. .................. 707/7 |
| 2006/0165571 A1 | 7/2006 | Seon et al. |
| 2006/0173910 A1 | 8/2006 | McLaughlin |
| 2006/0173916 A1 | 8/2006 | Verbeck Sibley et al. |
| 2006/0195438 A1 | 8/2006 | Galuten |
| 2006/0195462 A1 | 8/2006 | Rogers |
| 2006/0195513 A1 | 8/2006 | Rogers et al. |
| 2006/0195514 A1 | 8/2006 | Rogers et al. |
| 2006/0195515 A1 | 8/2006 | Beaupre et al. |
| 2006/0195516 A1 | 8/2006 | Beaupre |
| 2006/0195521 A1 | 8/2006 | New et al. |
| 2006/0195789 A1 | 8/2006 | Rogers |
| 2006/0195790 A1 * | 8/2006 | Beaupre et al. ................ 715/727 |
| 2006/0206811 A1 | 9/2006 | Dowdy |
| 2006/0218187 A1 * | 9/2006 | Plastina et al. ............. 707/104.1 |
| 2006/0253874 A1 | 11/2006 | Stark et al. |
| 2006/0259889 A1 | 11/2006 | Crosetto |
| 2006/0277098 A1 | 12/2006 | Chung et al. |
| 2006/0282311 A1 | 12/2006 | Jiang |
| 2006/0288044 A1 | 12/2006 | Kashiwagi et al. |
| 2006/0288367 A1 | 12/2006 | Swix et al. |
| 2007/0014536 A1 * | 1/2007 | Hellman ........................ 386/94 |
| 2007/0016507 A1 | 1/2007 | Tzara |
| 2007/0043829 A1 | 2/2007 | Dua |
| 2007/0061487 A1 * | 3/2007 | Moore et al. .................. 709/246 |
| 2007/0100690 A1 | 5/2007 | Hopkins |
| 2007/0118546 A1 | 5/2007 | Acharya |
| 2007/0136264 A1 | 6/2007 | Tran |
| 2007/0156677 A1 | 7/2007 | Szabo |
| 2007/0203790 A1 | 8/2007 | Torrens et al. |
| 2007/0214133 A1 | 9/2007 | Liberty |
| 2007/0244880 A1 | 10/2007 | Martin et al. |

| | | | |
|---|---|---|---|
| 2007/0250761 A1 | 10/2007 | Bradley et al. | |
| 2007/0271286 A1 | 11/2007 | Purang | |
| 2007/0288310 A1 | 12/2007 | Boos | |
| 2007/0294096 A1 | 12/2007 | Randall | |
| 2008/0004948 A1 | 1/2008 | Flake | |
| 2008/0004990 A1 | 1/2008 | Flake | |
| 2008/0027881 A1 | 1/2008 | Bisse | |
| 2008/0033897 A1* | 2/2008 | Lloyd | 706/19 |
| 2008/0046317 A1 | 2/2008 | Christianson | |
| 2008/0065471 A1* | 3/2008 | Reynolds et al. | 705/10 |
| 2008/0071136 A1 | 3/2008 | Oohashi | |
| 2008/0077264 A1 | 3/2008 | Irvin et al. | |
| 2008/0082467 A1 | 4/2008 | Meijer et al. | |
| 2008/0127121 A1* | 5/2008 | Fenton et al. | 717/131 |
| 2008/0133601 A1 | 6/2008 | Cervera et al. | |
| 2008/0155588 A1 | 6/2008 | Roberts et al. | |
| 2008/0220855 A1 | 9/2008 | Chen et al. | |
| 2008/0270221 A1 | 10/2008 | Clemens et al. | |
| 2009/0024504 A1 | 1/2009 | Lerman et al. | |
| 2009/0024510 A1 | 1/2009 | Chen et al. | |
| 2009/0073174 A1 | 3/2009 | Berg et al. | |
| 2009/0076939 A1 | 3/2009 | Berg et al. | |
| 2009/0076974 A1 | 3/2009 | Berg et al. | |
| 2009/0083307 A1 | 3/2009 | Cervera et al. | |
| 2009/0089222 A1 | 4/2009 | Ferreira De Castro et al. | |
| 2009/0103902 A1* | 4/2009 | Matsuura et al. | 386/124 |
| 2009/0106085 A1 | 4/2009 | Raimbeault | |
| 2009/0210415 A1 | 8/2009 | Martin et al. | |
| 2009/0276369 A1 | 11/2009 | Mabry et al. | |
| 2010/0082688 A1* | 4/2010 | Davis et al. | 707/789 |

FOREIGN PATENT DOCUMENTS

| | | |
|---|---|---|
| EP | 1420388 | 5/2004 |
| JP | 11052965 | 2/1999 |
| JP | 2002108351 | 4/2002 |
| JP | 2002-320203 | 10/2002 |
| JP | 2003255958 | 9/2003 |
| JP | 2004-221999 | 8/2004 |
| JP | 2005-027337 | 1/2005 |
| KR | 2002025579 | 4/2002 |
| WO | WO-03/051051 | 6/2003 |
| WO | WO-2004/070538 | 8/2004 |
| WO | WO-2005/013114 | 2/2005 |
| WO | WO-2006/052837 | 5/2006 |
| WO | WO-2006/075032 | 7/2006 |
| WO | WO-2006/114451 | 11/2006 |
| WO | WO-2007/075622 | 7/2007 |
| WO | WO-2007/092053 | 8/2007 |
| WO | WO-2007/134193 | 11/2007 |
| WO | WO-2009/149046 | 12/2009 |

OTHER PUBLICATIONS

Maidin, Donncha O. et al., The Best of Two Worlds: Retrieving and Browsing, Proceedings of the COST G-6 Conference on Digital Audio Effects (DAFX-00), Verona, Italy, Dec. 7-9, 2000, 4 pages.
Treemap, University of Maryland, http://www.cs.umd.edu/hcil/treemap/, last updated Aug. 5, 2003, 4 pages.
Rauber, Andreas et al., The SOM-enhanced Juke-Box: Organization and Visualization of Music Collections Based on Perceptual Models, Journal of New Music Research, vol. 32, Nov. 2, 2003, pp. 193-210.
Trustees of Indiana University, Variations2, The Indiana University Digital Music Library, http://dml.indiana.edu/, last updated May 11, 2005, 1 page.
Shneiderman, Ben, Treemaps for Space-Constrained Visualization of Hierarchies, http://www.cs.umd.edu/hcil/treemap-history/, last updated Apr. 28, 2006, 16 pages.
International Search Report Authority/US; PCT Search Report; Dated Mar. 25, 2008; 3 pages.
Shneiderman, Ben, Tree Visualization with Tree-Maps: 2-d Space-Filling Approach, ACM Transactions on Graphics, vol. 11, No. 1, Jan. 1992, pp. 92-99.
Tzanetakis, George, et al., MARSYAS3D: A Prototype Audio Browser-Editor Using a Large Scal Immersive Visual and Audio Display, Proceedings of the 2001 International Conference on Auditory Display, Espoo, Finland, Jul./Aug. 2001, 5 pages.
Logan, Beth et al., A Music Similarity Function Based on Signal Analysis, IEEE International Conference on Multimedia and Expo (ICME), Tokyo, Japan, Aug. 2001, IEEE Press, pp. 952-955.
Cano, Pedro, et al. On the Use of FastMap for Audio Retrieval and Browsing, The International Conferences on Music Information Retrieval and Related Activities (ISMIR 2002), Paris, France, Oct. 2002, 2 pages.
Logan, Beth, Content-Based Playlist Generation: Exploratory Experiments, The Intenational Conferences on Music Information Retrieval and Related Activities (ISMIR 2002), Paris, France, Oct. 2002, 2 pages.
Pauws, Steffen et al., PATS: Realization and User Evaluation of an Automatic Playlist Generator, The International Conferences on Music Information Retrieval and Related Activities (ISMIR 2002), Paris, France, Oct. 2002, 9 pages.
Pampalk, Elias et al., Content-based Organization and Visualization of Music Archives, ACM Multimedia, Juan les Pins, France, Dec. 2002, pp. 570-579.
Connell, Iain et al., Ontological Sketch Models: Highlighting User-System Misfits, in P. Palanque, E. O'Neill and P. Johnson, editors, Proceedings of Human Computer Interaction (HCI), Bath, England, Sep. 2003, London Springer, pp. 1-16.
Torrens, M. et al.: "Visualizing and Exploring Personal Music Libraries" Proceedings Annual International Symposium on Music Information Retrieval, XX, XX; Oct. 10, 2004; whole document.
International Search Report in PCT/US09/051233 dated Sep. 4, 2009; 3 pages.
Extended European Search Report in EP 06 82 5435 dated Nov. 2, 2009.
Augmenting the Social Space of an Academic Conference; McCarthy, et al. Information School, University of Washington and Department of Computer Science and Engineering, University of Minnesota; pp. 1-10; Nov. 6-10, 2004. Retrieved from the internet: <URL: http://interrelativity.com/joe/publications/ProactiveDisplays-CSCW2004.pdf> entire document.
Toward University Mobile Interaction for Shared Displays; Tim Paek, et al.; Microsoft Research, Redmond, WA; pp. 1-4; Nov. 6-10, 2004. Retrieved from the internet: <URL: http://research.microsoft.com/~timpaek/Papers/cscw2004. pdf> entire document.
Co-Construction of Hybrid Spaces; Asa Rudstrom; A Dissertation submitted to the University of Stockholm in partial fulfillment of the requirements for the Degree of Doctor of Philosophy; Department of Computer and Systems Sciences Stockholm University and Royal Institute of Technology; pp. 1-69; Nov. 2005. Retrieved from the Internet: <URL: http://www.sics.se/~asa/Thesis/CoverPaper.pdf> entire document.
MobiLenin—Combining a Multi-Track Music Video, Personal Mobile Phones and a Public Display into Multi-User Interactive Entertainment; Jurgen Scheible, et al. Media Lab, University of Art and Design, Helsinki, Finland; pp. 1-10; Nov. 6-10, 2005. Retrieved from the internet: <URL: http://www.mediateam.oulu.fi/publications/pdf/660.pdf> entire document.
Jacucci, et al., Integrated Project on Interaction and Presence in Urban Environments. Feb. 9, 2007. Retrieved from the internet: <URL: http://ipcity.eu/wp-content/uploads/2007/02/D7.1%20-%20Demonstrator°/020of%20Large-Scale%20Events%20Application.pdf> see p. 20.
PCT/US2006/034218; USPTO Search Authority; PCT International Search Report; Feb. 9, 2007; 3 pages.
PCT/US06/38769; International Search Report; Mar. 25, 2008.
PCT/US2006/003795; International Search Report and Written Opinion of International Application, dated May 28, 2008.
PCT/US2006/048330; International Bureau; PCT Search Report; Mar. 20, 2008; 10 pages.
"PCT International Preliminary Report on Patentability (Ch II) dated May 22, 2007", PCT Application No. PCT/ES2005/00003.
"PCT Written Opinion dated Jul. 15, 2009", PCT Application No. PCT/US09/45911.
"PCT Written Opinion dated Feb. 17, 2010", PCT Application No. PCT/US09/068604.
"PCT International Search Report and Written Opinion dated Jun. 5, 2009", PCT Application No. PCT/US09/42002.

"PCT International Search Report and Written Opinion dated Dec. 7, 2007", PCT Application No. PCT/US2007/068708.

"PCT International Search Report dated Jul. 15, 2009", PCT Application No. PCT/US2009/45725.

"PCT International Search Report Dated Sep. 4, 2009", PCT Application No. PCT/U52009/051233.

"PCT Written Opinion of the International Searching Authority dated Jan. 12, 2006", PCT Application No. PCT/ES2005/000213.

"PCT Written Opinion of the International Searching Authority Report dated Jun. 10, 2005", PCT Application No. PCT/ES2005/00003.

* cited by examiner

REAL-TIME VISUALIZATION OF USER CONSUMPTION OF MEDIA ITEMS

RELATED APPLICATION DATA

This application claims the benefit of U.S. Provisional Application Ser. No. 61/102,199, filed Oct. 2, 2008, which is incorporated by reference in its entirety herein.

CROSS REFERENCE TO COMPUTER PROGRAM LISTING IN APPENDIX

A portion of the present disclosure is contained in a computer program listing in Appendix A. The contents of the Appendix A are incorporated herein by reference.

The contents of this file are subject to copyright protection. The copyright owner has no objection to the reproduction by anyone of the patent document or the appendix as it appears in the Patent and Trademark Office patent files or records, but does not waive any other copyrights by virtue of this patent application.

COPYRIGHT NOTICE

© 2008-2009 Strands, Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

BACKGROUND

1. Technical Field

The present disclosed technology relates to systems for tracking user consumption and more particularly to methods for tracking and visualizing real-time computer mediated user consumption.

2. Description of the Related Art

Computer mediated social networking systems provide users with access to network forums for sharing and accessing information about products and services used by others in the network. This information can be gathered and made accessible to users in the network in various ways.

SUMMARY

Briefly, disclosed herein is a system for visualizing in real-time computer mediated user consumption of products and services. The system is configured to display information about products and services in such a way as to show connections between users and the products and services they consume. The system provides insight into how products and services are related while providing a temporal context for such information.

For clarity, the embodiments described herein relate to a system for visualizing real-time user access and consumption of media files containing music, video and/or other electronic media, referred to hereinafter as 'media items.' However, the embodiments provided herein are for illustrative purposes only and claimed subject matter is not limited to the embodiments described. For instance, the disclosed system and associated devices may also model and/or display real-time visualization of user consumption of other goods and/or services. The consumable in such other embodiments may be participation in online games, online purchases of consumer products, social networking activities, news feeds and/or buying/selling financial instruments online and claimed subject matter is not limited in this regard.

The embodiments described herein relate to a system comprising a computer display visualization tool hereinafter referred to as an 'applet.' The applet implements real-time consumption data management and real-time visualization of user media item consumption activity. In one embodiment, the system accesses user media item consumption data from one or more databases via an Application Programming Interface (API), parses and stores the consumption data in data structures. The consumption data management system and method of storing the consumption data in the data structures is configured to reveal associations between consumers, consumed products and/or services, or combinations thereof. The applet displays a visualization of the media item consumption data by accessing the data structures and displaying the stored consumption data to show associations between media items, users and/or consumption events, or combinations thereof.

In one embodiment, the applet parses the media item consumption data, extracts artist information, and renders artists as 'nodes' in the visualization display. The visualization of music media consumption appears as graphical representations of the music artists, preferably using currently available album art. The nodes are rendered using a "force directed placement" algorithm which spreads them out to avoid overlapping. The nodes are also configured such that a user may click and drag the nodes to change their position in the applet window. In one embodiment, information about the artist, song, and/or the user who listened to the song is available by 'hovering' a cursor over the artist node.

In addition to the 'spreading' behavior of the artist nodes, the nodes also 'attract' one another if they are determined to be correlated such as when two artists' tracks co-occur in a given user's playstream. This attraction behavior may cluster associated nodes together in the display and make associations between nodes more clear. Additionally, an association between nodes is indicated with a line connecting the two nodes. Thus, attraction between associated nodes serves to minimize connector line overlap in the display.

These and other features and advantages will become apparent from the following detailed description of illustrative embodiments thereof, which is to be read in connection with the accompanying drawings.

DETAILED DESCRIPTION

Digital Processor and Associated Memory

Figure 1:
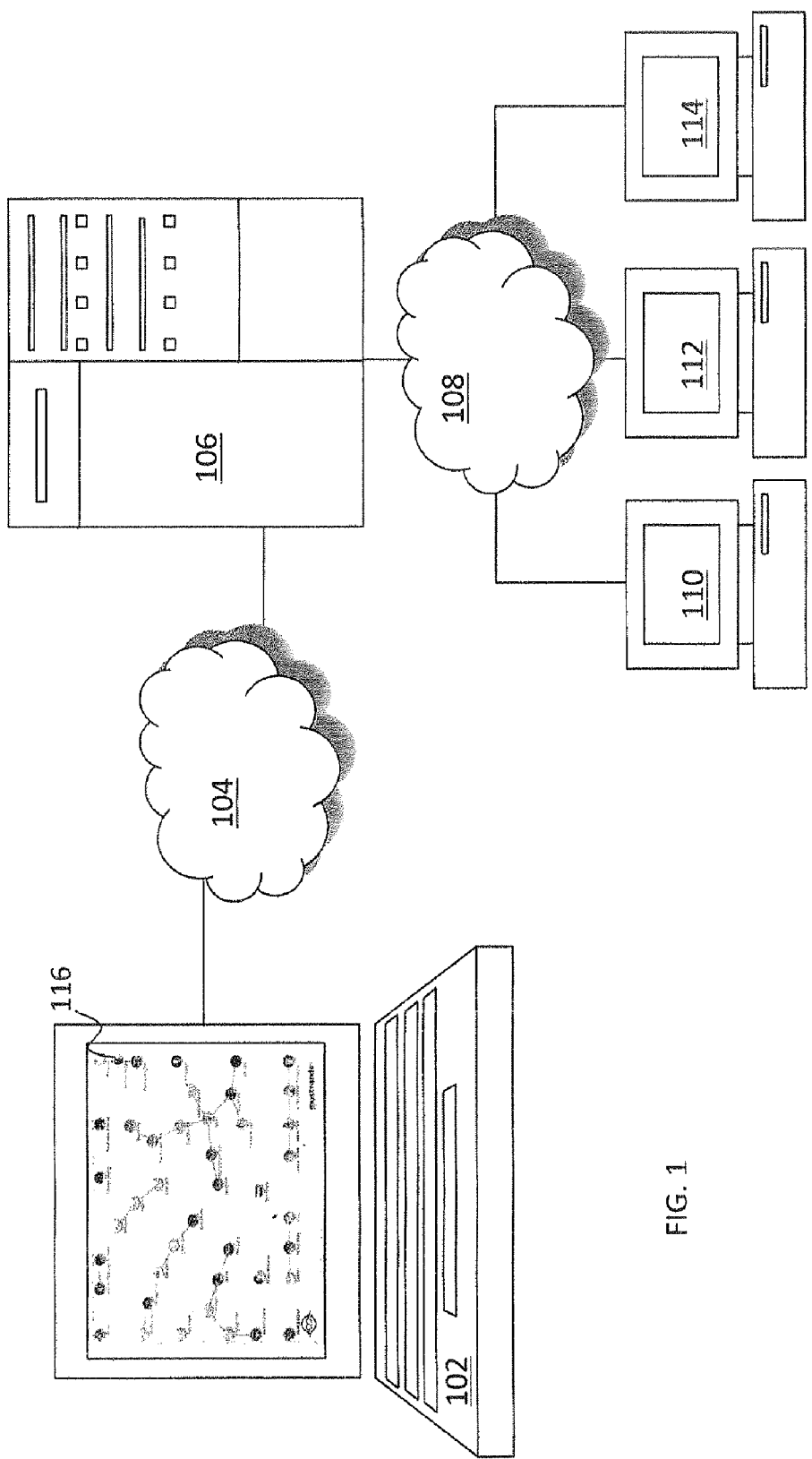
FIG. 1 is a block diagram illustrating an embodiment of a system for visualizing real-time user consumption.

The disclosed technology in some embodiments may be implemented by a digital computing system. By the term digital computing system we mean any system that includes at least one digital processor and associated memory, wherein the digital processor can execute instructions or "code" stored in that memory. (The memory may store data as well.) A digital processor includes but is not limited to a microprocessor, multi-core processor, DSP (digital signal processor), vocoder, processor array, network processor, etc. A digital processor may be part of a larger device such as a laptop or desktop computer, a PDA, cell phone, iPhone PDA, Blackberry® PDA/phone, or indeed virtually any electronic device.

The associated memory, further explained below, may be integrated together with the processor, for example RAM or FLASH memory disposed within an integrated circuit microprocessor or the like. In other examples, the memory comprises an independent device, such as an external disk drive, storage array, or portable FLASH key fob. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such a conventional rotating disk drive. All such memories are "machine readable" in that they are readable by a suitable digital processor as further explained below for the benefit of the USPTO.

Storage of Computer Programs

As explained above, the present disclosed technology preferably is implemented or embodied in computer software (also known as a "computer program" or "code"; we use these terms interchangeably). Programs, or code, are most useful when stored in a digital memory that can be read by a digital processor. We use the term "computer-readable storage medium" (or alternatively, "machine-readable storage medium") to include all of the foregoing types of memory, as well as new technologies that may arise in the future, as long as they are capable of storing digital information in the nature of a computer program or other data, at least temporarily, in such a manner that the stored information can be "read" by an appropriate digital processor. By the term "computer-readable" we do not intend to limit the phrase to the historical usage of "computer" to imply a complete mainframe, minicomputer, desktop or even laptop computer. Rather, we use the term to mean that the storage medium is readable by a digital processor or any digital computing system. Such media may be any available media that is locally and/or remotely accessible by a computer or processor, and it includes both volatile and non-volatile media, removable and non-removable media.

Computer Program Product

Where a program has been stored in a computer-readable storage medium, we may refer to that storage medium as a computer program product. For example, a portable digital storage medium may be used as a convenient means to store and transport (deliver, buy, sell, license) a computer program. This was often done in the past for retail point-of-sale delivery of packaged ("shrink wrapped") programs. Examples of such storage media include without limitation CD-ROM and the like. Such a CD-ROM, containing a stored computer program, is an example of a computer program product.

FIG. 1 is a block diagram illustrating an embodiment of a system for visualizing real-time user consumption in a network. The visualization system leverages a network visualization technique called 'force-directed placement' to achieve an 'aesthetically pleasing' representation of a network structure. The aesthetics of network/graph layout techniques involve minimizing edge length (assuming all edges are unit), while also minimizing overlapping edges. The mathematics of finding and/or proving a 'perfect' layout are very difficult and intractable for most problems and computing environments. However, 'good enough' representations can be generated through techniques that iteratively improve a network layout from a random starting condition.

In one embodiment, the real-time user consumption network visualization may be implemented on a computer as a ShockWave Flash (SWF) applet using Javascript, Personal Home Page (PHP) or other appropriate web technologies. In another embodiment, it may be written in a language called haXe. HaXe is a web-based language that can target a wide variety of web platforms including SWF, Javascript, PHP from a single syntax and compiler.

In one embodiment, user terminals 110, 112 and 114 are in communication with database server 106 via network 108. Server 106 may store media files that may be accessed by users via terminals 110, 112 and 114 via network 108. Server 106 may store events comprising computer mediated real-time user consumption data. In one embodiment, the consumption data is associated with users accessing media files.

For instance, the media files may be music files and consumption data may be instances of user downloads or plays. Server 106, additionally, may record and/or store the name of the artist, album title, album art, track and/or user ID each time a music track is accessed from server 106.

User terminal 102 may access the data stored in a database server 106 via network 104. The consumption data concerning the media files may be visualized in a display 116 on user terminal 102. The real-time consumption data may be updated periodically by accessing server 106 and new consumption data may be parsed, stored and arranged in a data structure and then added to the visualization in display 116 according to the arrangement in the data structure.

User terminals 102, 110, 112 and 114 may comprise any of a variety of electronic communication devices including personal computers and/or mobile telephones. Network 108 may be any of a variety of networks including the Internet and/or an Enterprise Network Intranet. Claimed subject matter is not limited in this regard.

Figure 2:
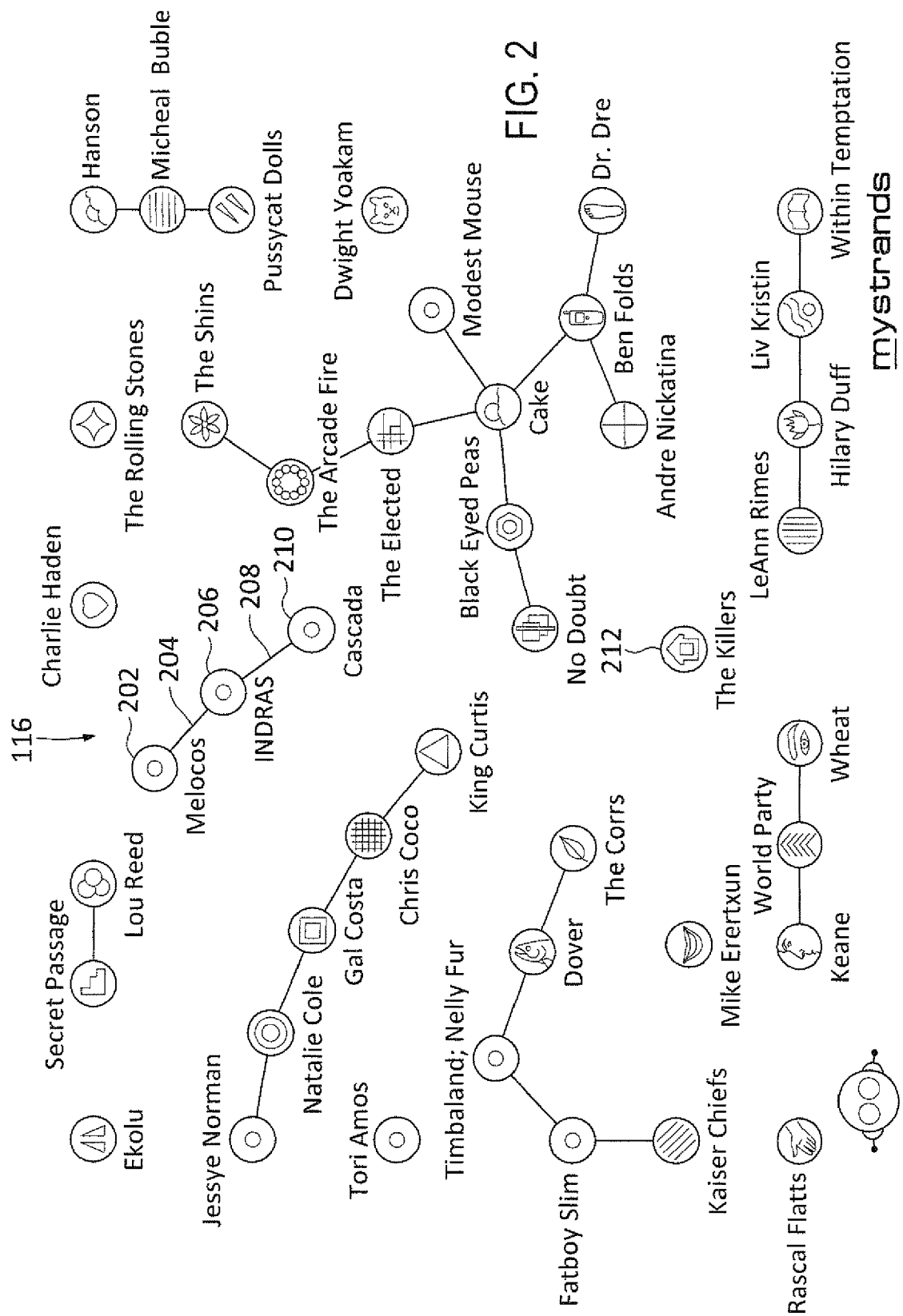
FIG. 2 is a screenshot of an embodiment of an applet window showing real-time user consumption of media items.

FIG. 2 is an illustration of an embodiment of a display screen 116 visualizing real-time user consumption data as described with reference to FIG. 1. Display 116 shows multiple nodes (e.g., nodes 202, 206 and 210) each representing an artist. The nodes may be free floating (e.g., node 212) or connected via lines or edges (e.g., edges 204 and 208). In one embodiment, edges between nodes indicate that there is a correlation between the nodes. For instance, an edge 204 connecting node 202 and node 206 indicates that a track by artist INDRAS represented by node 206 was played by a particular user wherein the same user also played a track by artist Melocos represented by node 202 in consecutive order, either just prior to or just after playing the track by INDRAS.

Figure 3:
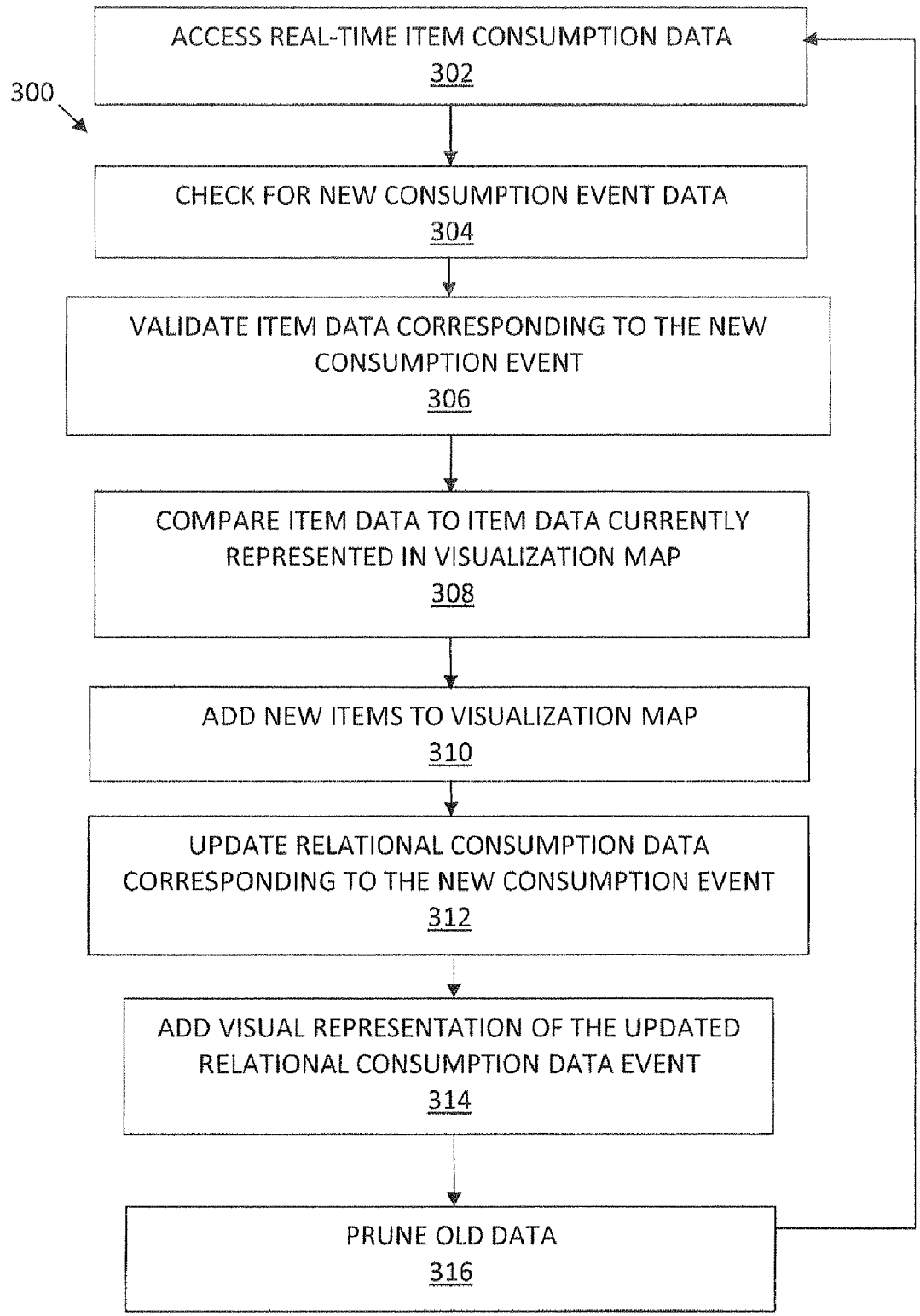
FIG. 3 is a flow diagram illustrating an embodiment of a process for visualizing real-time user consumption.

FIG. 3 is a flow diagram illustrating an overview of an embodiment of process 300 for visually mapping real-time user consumption data on a display (e.g., display 116 in FIG. 1).

At operation 302, real-time media item consumption data is accessed and parsed to select play events related to user's listening behavior. In the current embodiment, the events are "play" events. However, in certain embodiments, the consumption data may be parsed to select events comprising data corresponding to a variety of other predetermined consumption behaviors.

In some embodiments, consumption data comprises, for each event an artist's name, album name, track title and/or a media item consumption event such as whether the media item was: purchased, played, replayed', tagged and/or skipped. Consumption data may be accessed at pre-determined intervals or access may be triggered by another mechanism such as when a new real-time media item consumption event occurs or if artist information is updated.

In one embodiment, the play events are assigned an incremental ID and each event is associated with a user. Incremental IDs may be assigned by a server or may be assigned on the client side. At operation 304, the play events are analyzed to determine whether they are new play events based on the incremental IDs. The highest IDs indicate the latest information accessed. The current play event IDs are compared to previously stored play event IDs and if a current play event ID is less than or equal to any of the previously stored play event IDs then the current play event is ignored. New play events are stored in an event stack having a predetermined stack limit and then arranged in a data structure wherein the data structure shows correlations between consumption data items and includes a temporal aspect. An embodiment of real-time user consumption data analysis of play events is discussed in further detail below with respect to FIG. 14.

At operation 306, if a new play event has been accessed, media item consumption data corresponding to the new play event is analyzed to determine whether the media item consumption data (e.g., artist name or track title) is valid. Data validation may be done by comparing new media item consumption data with a database containing media item data and/or by verifying that the entries themselves are valid. Media item validation is explained in further detail below.

At operation 308, the media item data corresponding to the most recent play events are compared to the current media item data represented in visualization display 116. At operation 310, if the most recently accessed media item data is not represented in the current visualization display 116, then the new media item data is added to update the visualization display 116.

At operation 312, the play events are analyzed to determine whether new relationships between represented media item data have formed. Referring back to FIG. 2 briefly, the consumption data corresponding to the play events may indicate that a particular user who previously played a song by INDRAS (node 206) played a song by Cascada (node 208) immediately after playing the song by INDRAS (node 206).

At operation 314, if display 116 does not already show an edge between nodes 206 and 210 to represent this new relationship then a line or edge 208 is generated to represent the correlation between play events for artists INDRAS and Cascada with respect to the particular user. However, if the line or edge 208 was already shown in display 116 then a new line will not be generated. Rather, user information would simply be updated without changing the display 116.

At operation 316, old play event data is pruned. First an oldest event in the event stack it identified and then counters associated with the media item consumption data corresponding to the oldest event are decremented in the data structure. This pruning helps keep the visualization display uncluttered. Using this pruning method, relevant data is updated and outdated or obsolete data is removed from the data stack and at a certain point the media item consumption data is removed from the data structure as well. The data pruning process is described in greater detail below.

Figure 4:
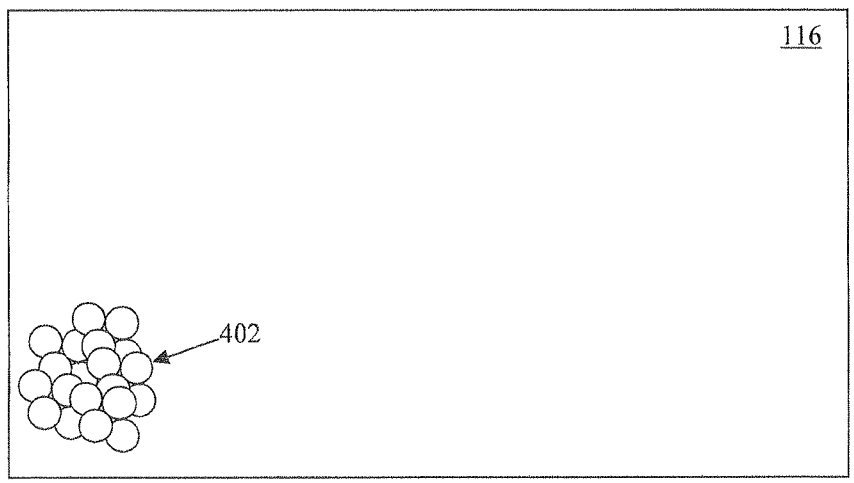
FIG. 4 is a diagram that shows an embodiment of the applet at startup upon retrieving a listening history from the server, and subsequent initial placement of nodes.

FIG. 4 is a diagram illustrating an embodiment of a display 116 of the real-time user consumption visualization applet at startup. Upon accessing and processing a set of consumption data from server 106, nodes 402 representing artists whose tracks are played by one or more users appear on display 116. Initially, prior to application of the force-directed placement techniques, the nodes 402 appear without a particular orientation in display 116.

Force-directed placement involves specifying current vertex stress levels as a set of forces acting upon the vertex. These forces are generally attractive forces (Hooke's Law) generated from directly connected nodes, and repellant forces (Coulomb's Law) generated from all other nodes.

Figure 5:
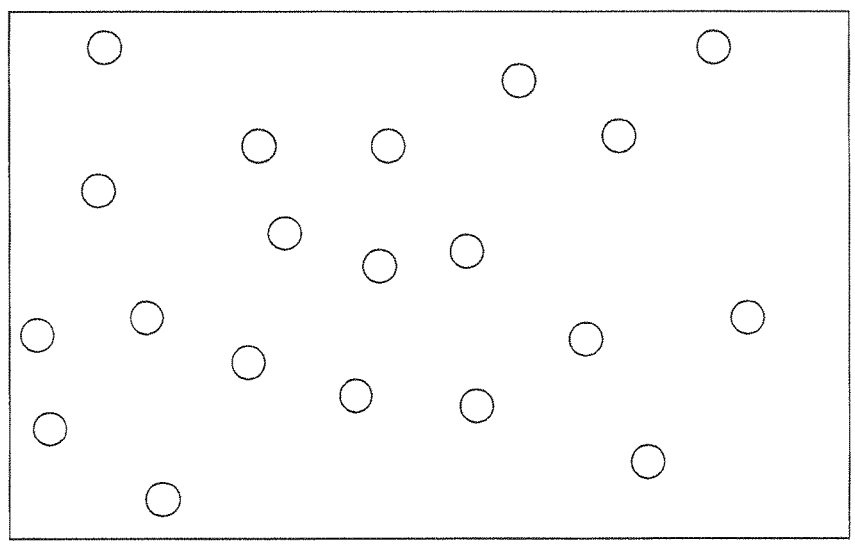
FIG. 5 illustrates a time period shortly after that of FIG. 4, showing the dispersal of the nodes according to force directed-placement.

FIG. 5 illustrates display 116 of the applet at a time shortly after that illustrated in FIG. 4, showing the dispersal of the nodes 402 according to the attractive and repulsive forces applied by the force-directed placement technique. The placement of nodes 402 in FIG. 5 represents how the nodes 402 appear to disperse prior to occurrence of media consumption events that connect nodes 402.

Figure 6:
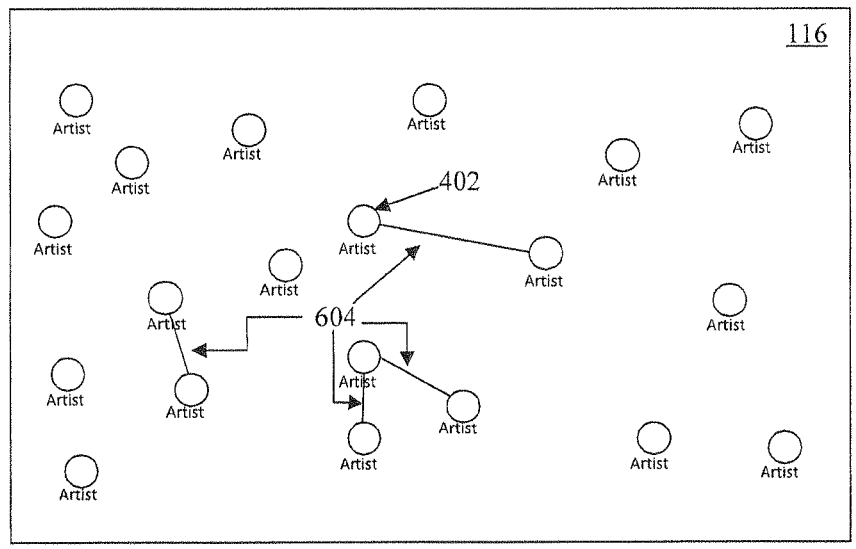
FIG. 6 is a diagram that shows an embodiment of the applet window showing the strands of different users. Lines connect different artists together when they are played consecutively by the same user. Nodes are identified by artist name.

FIG. 6 is a diagram of display 116 of the applet at a time after the applet generated edges 604 connecting some nodes 402 corresponding to media consumption events. In one embodiment, edges 604 between various nodes 402 appear in display 116 upon accessing media consumption data from server 106 indicating a correlation between the different artists represented by different nodes 402. For instance, when two different artist's tracks are played consecutively by a same one or more users, an edge 604 appears in display 116 connecting the two nodes 402 representing the artists whose tracks were played consecutively. Nodes 402 also display the names of the artist they represent below the node.

In one embodiment, when an edge 604 connects two nodes 402, a spring force algorithm directs the placement of the connected nodes with respect to each other in display 116. At an update interval, the positions of the nodes 402 changes depending on the cumulative force acting on each of nodes 402 to account for new media consumption data accessed from server 106 and newly generated edges 604 appearing between some of nodes 402.

The positions of all nodes 402 are continually updated until the overall level of stress plateaus or reaches a predetermined threshold. Additionally, a given degree of 'damping' is applied. This force is essentially a form of friction that helps to ensure that the network rapidly achieves a steady state.

Figure 7:
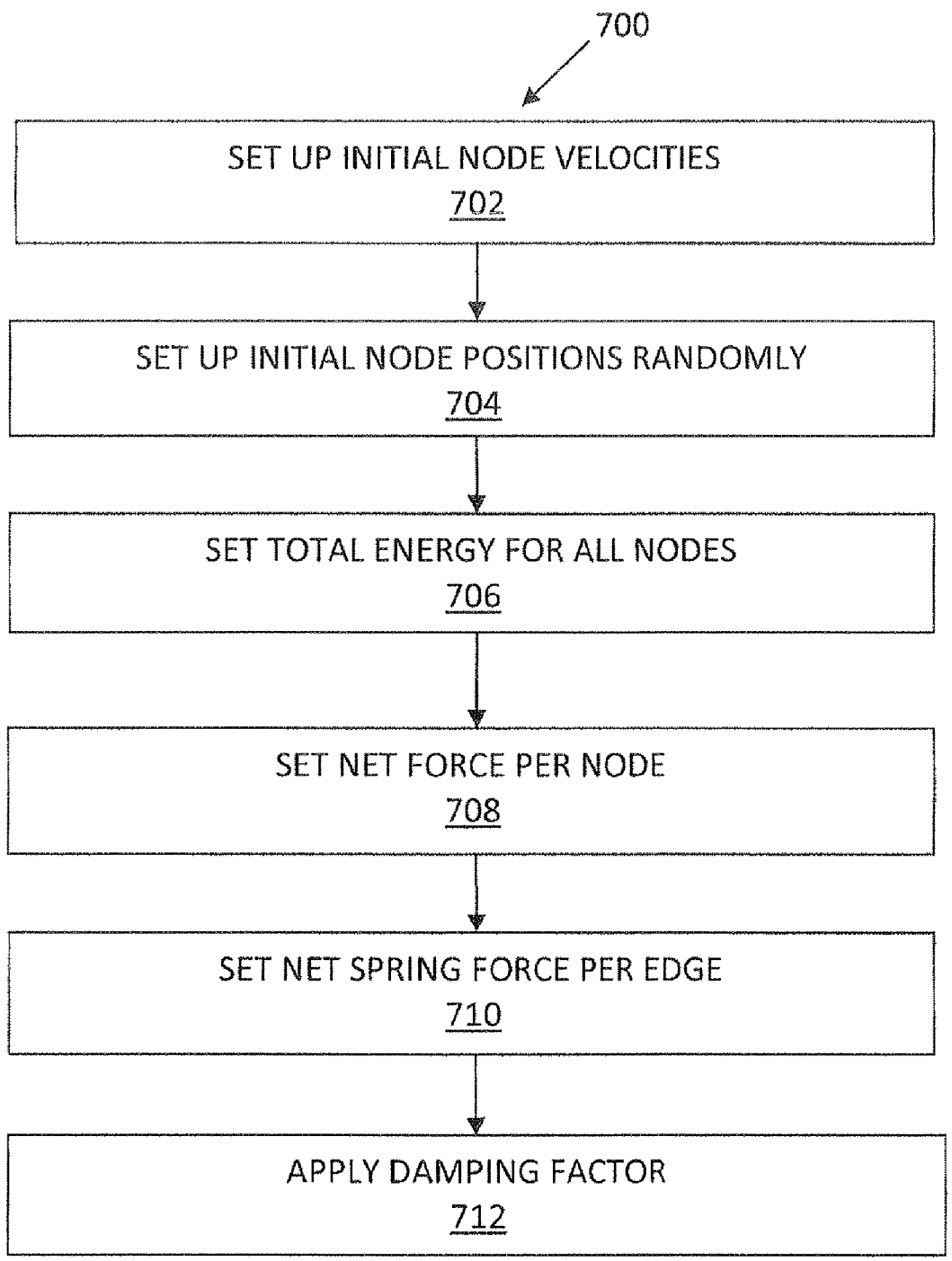
FIG. 7 is a flow diagram of an embodiment of a process for force-directed placement of nodes in a display.

FIG. 7 illustrates a process 700 for displaying nodes 402 using force-directed placement. At operation 702, the initial velocities for the nodes are set. At operation 704, the initial positions for the nodes are set. No two nodes are placed in the same position in display 116. At operation 706, the total simulated energy of the system displayed is set including the sum of total energy for each of nodes 402. At operation 708, the net-force is set for each node 402. The total force on a particular node 402 is set with respect to each other node 402 in the system displayed. The net-force on each node 402 includes Coulomb repulsion with respect to all other nodes 402 in the system. At operation 710, the net-force for each edge 604 (modeled as a spring) connecting two nodes 402 is set. This net-force includes Hooke attraction/spring force. At operation 712, a damping factor is applied to the system in order to allow the system to reach equilibrium.

Figure 8:
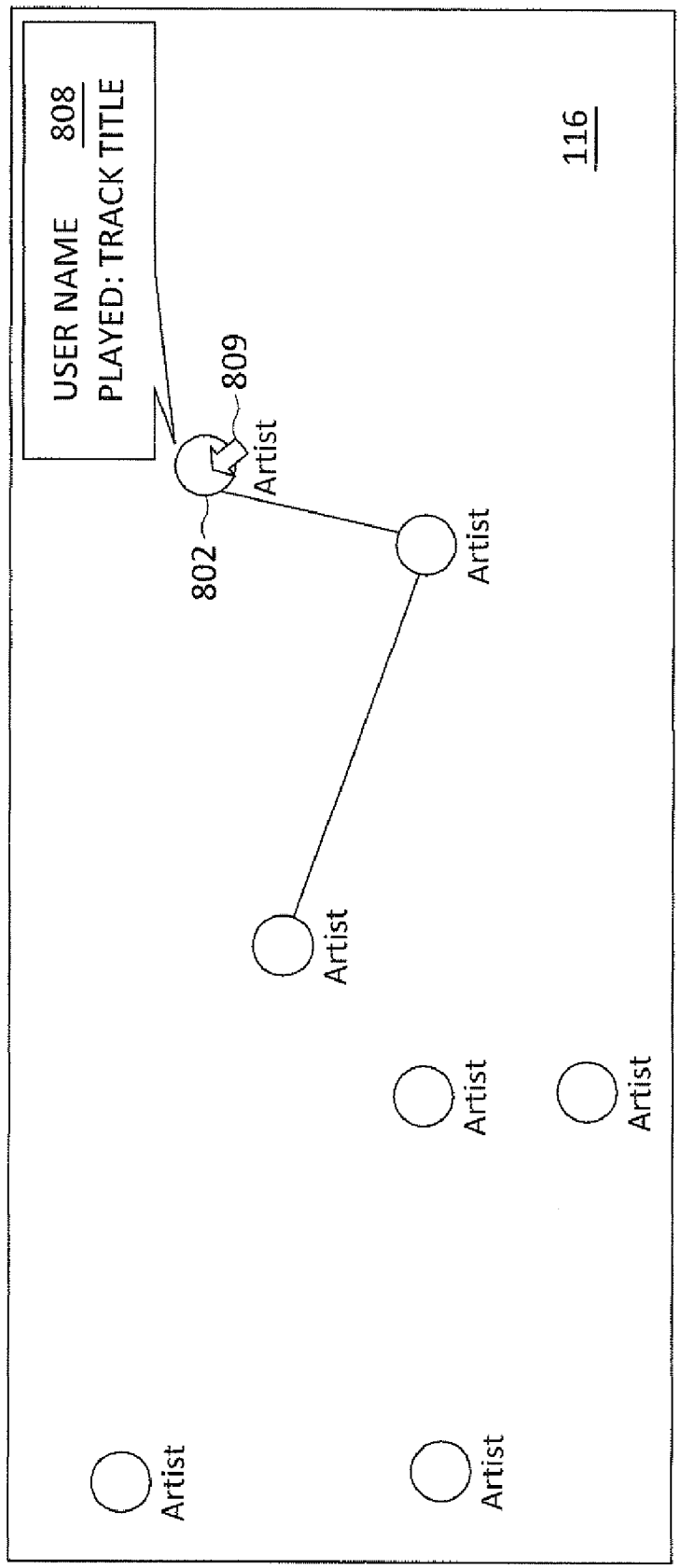
FIG. 8 is a diagram that shows an embodiment of the applet wherein extended information "pops-up" in a graphic when the cursor is placed over a node.

FIG. 8 illustrates an embodiment of the applet display 116 wherein certain information associated with node 802 may be displayed by cursoring over the node 802. In this embodiment, the user ID and track title are made visible in a pop-up graphic 808 when the cursor 809 is hovered over the node 802. In some embodiments, the applet will finish its current update (loading the XML information), and then wait for the user to release the cursor before loading any more information.

Figure 9:
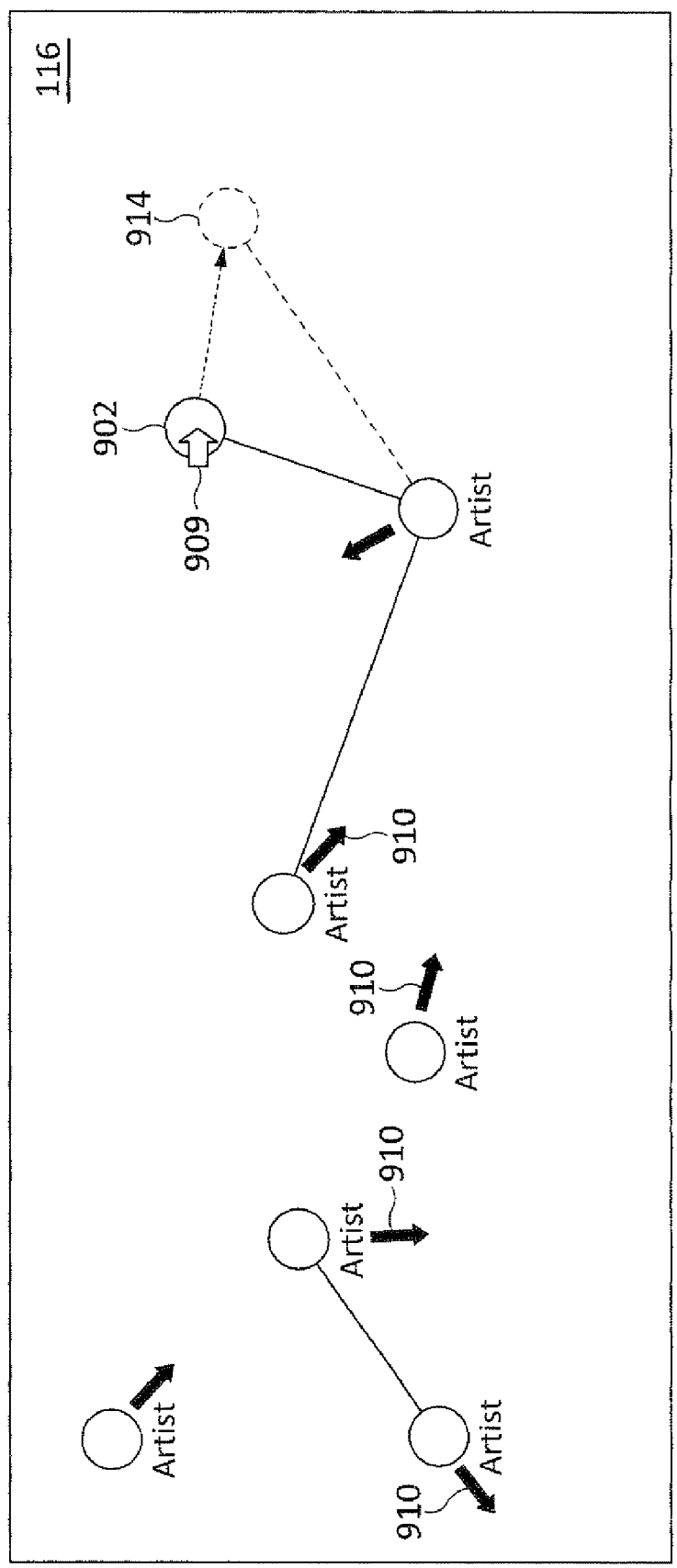
FIG. 9 is a screenshot from an embodiment of the applet window while the cursor is placed over a node.
Figure 10:
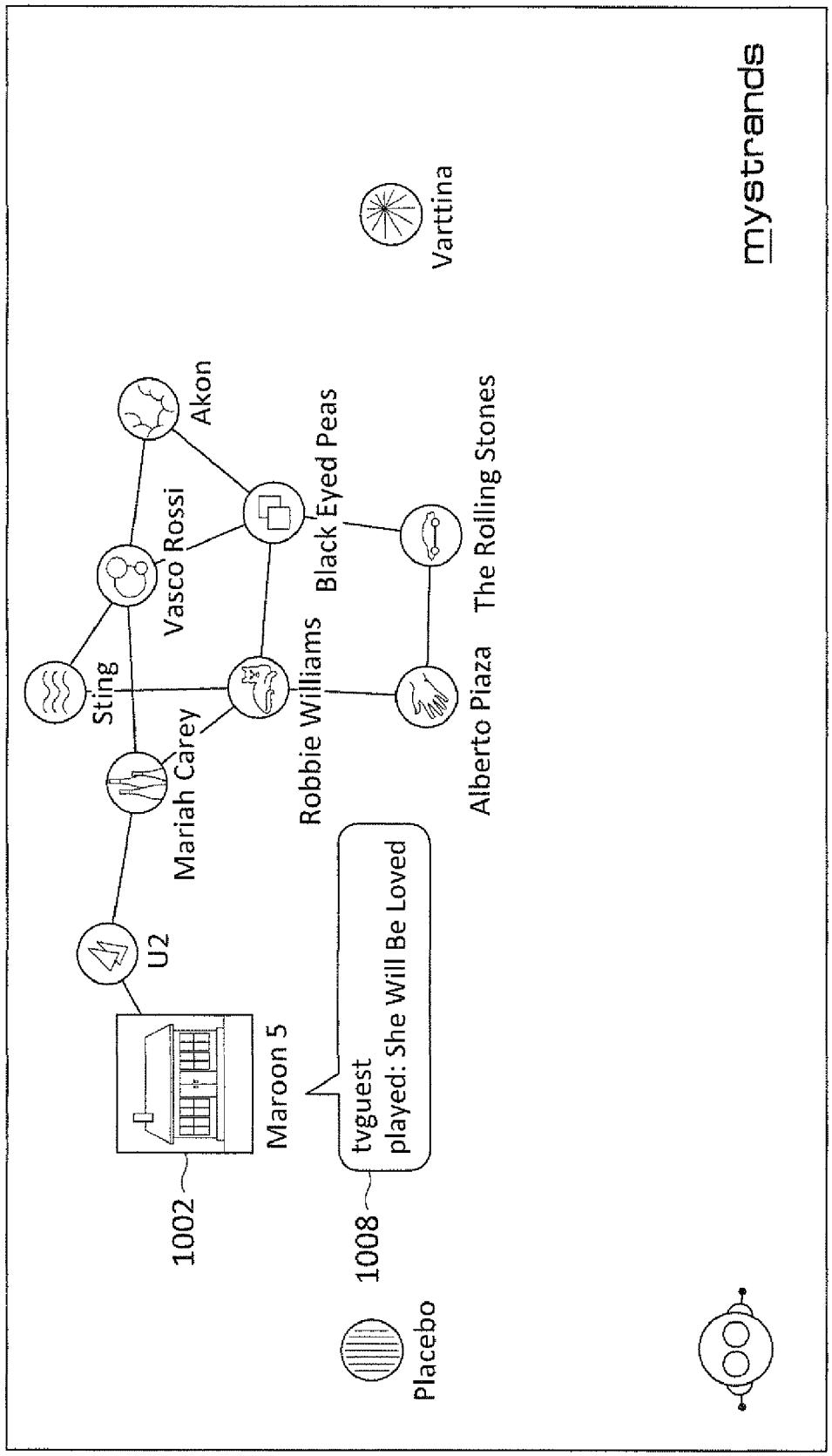
FIG. 10 illustrates the effect on neighboring nodes when a node is dragged to a new location in the applet window.

FIG. 9 illustrates an embodiment of the applet display 116 showing the effect on neighboring nodes when a node 902 is dragged by cursor 909 to a new position 914. Force vectors 910 show the direction of simulated net-forces acting on corresponding nodes when node 902 is dragged to the new position 914 in display 116. In one embodiment, the nodes and edges will reposition themselves according to the force-directed placement algorithm discussed with respect to FIG. 7, FIG. 10 is a screenshot from an embodiment of the applet taken while the cursor (not shown) is hovering over an artist node 1002. In FIG. 10, artist node 1002 is obscured by the full version of the album art that "pops-up" when the cursor hovers over the node 1002. Node 1002 is a circle and only shows so much of the album art as will fit within the circular node. The album art is from the album corresponding to the last played track by the artist.

Additionally, hovering the cursor over node 1002 brings up an extended information pop-up graphic 1008 that displays the user's name or ID to play a track by the artist corresponding to node 1002. The last played track is also displayed in pop-up graphic 1008.

Figure 11:
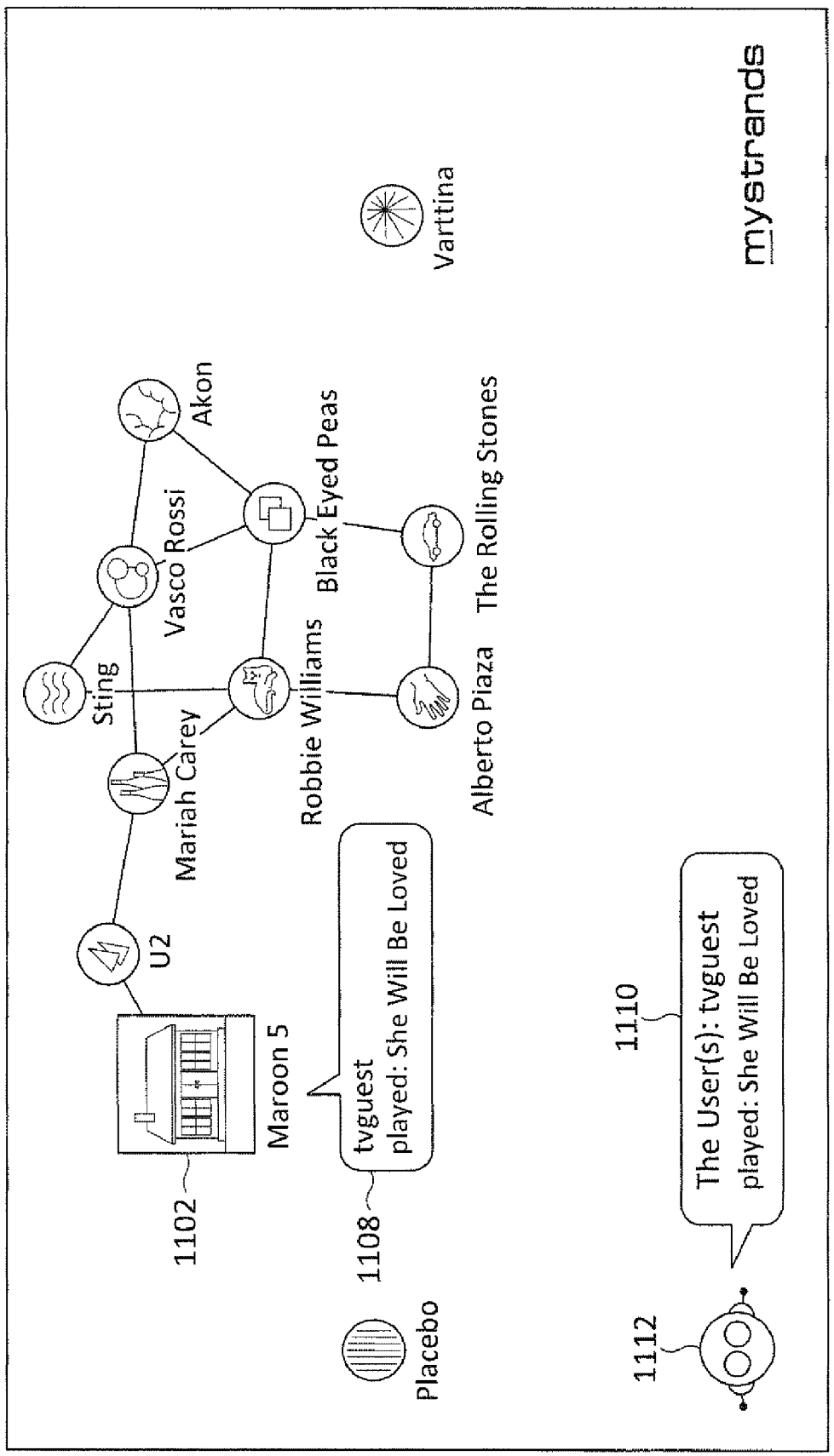
FIG. 11 is a screenshot from the applet showing information graphics that display after hovering or clicking the cursor on a node.

FIG. 11 is a screenshot from an embodiment of the applet showing a pop-up graphic 1108 that is displayed when a user hovers over node 1102 and/or selects node 1102 by clicking the cursor on the node. In this embodiment, the pop-up graphic 1108 provides the last user's name and last tracks played by the artist corresponding to the node 1102.

Additionally, in one embodiment, another pop-up graphic 1110 appears next to icon 1112 in the lower left corner of the applet window when node 1102 is selected by clicking node 1102 with the cursor (not shown). The pop-up graphic 1110 displays additional information about the user(s) and artist corresponding to the artist node 1102 selected. Pop-up graphic 1110 includes information about the recent users who have played the artist associated with the selected node 1102, and which songs by the artist have been recently played. Additional information on the users and artist may be accessed via hyper-links provided in pop-up graphic 1110.

Figure 12:
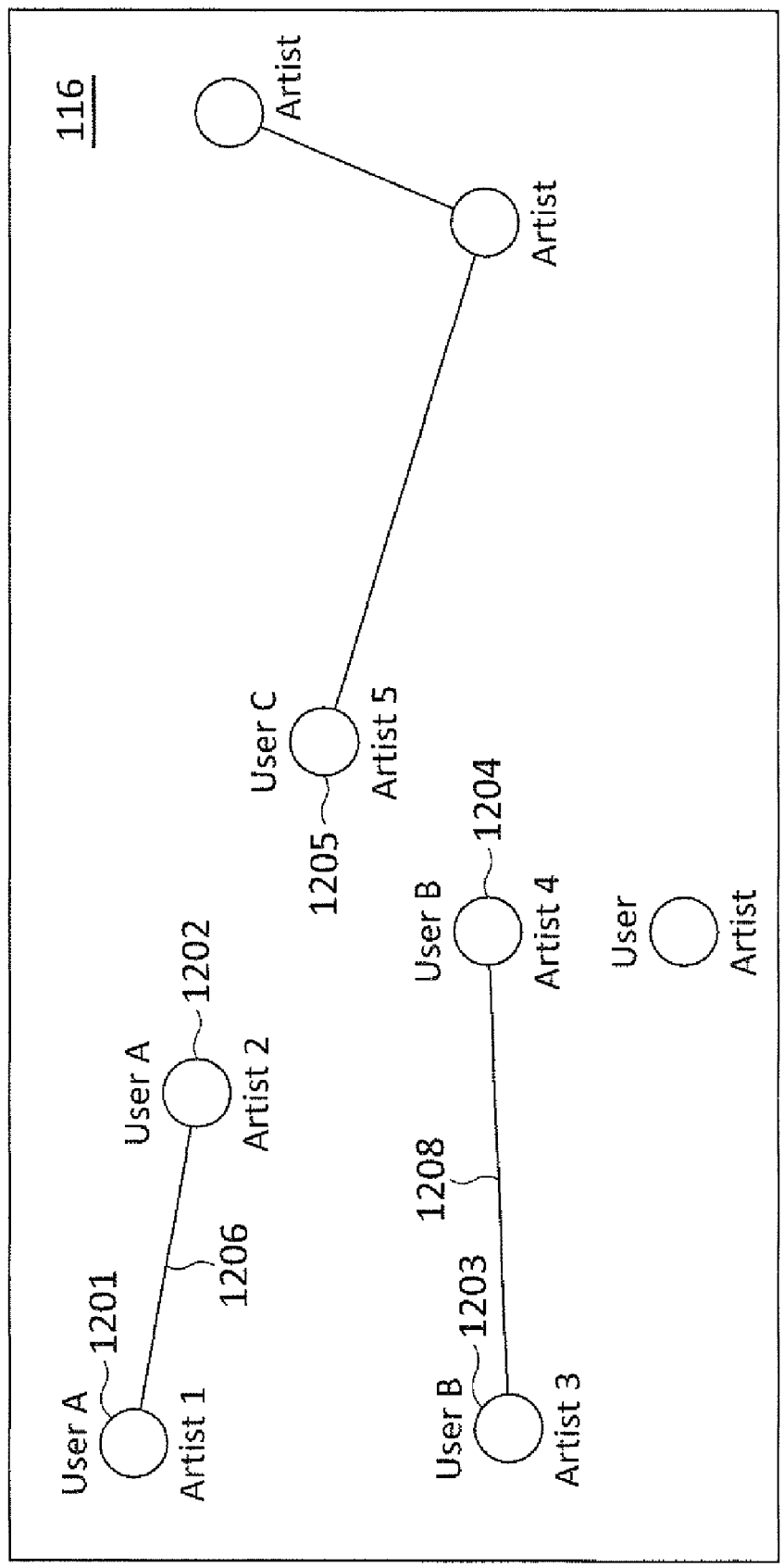
FIG. 12 and FIG. 13 diagram the effect when two nodes are connected by two different users playing the same artist.
Figure 13:
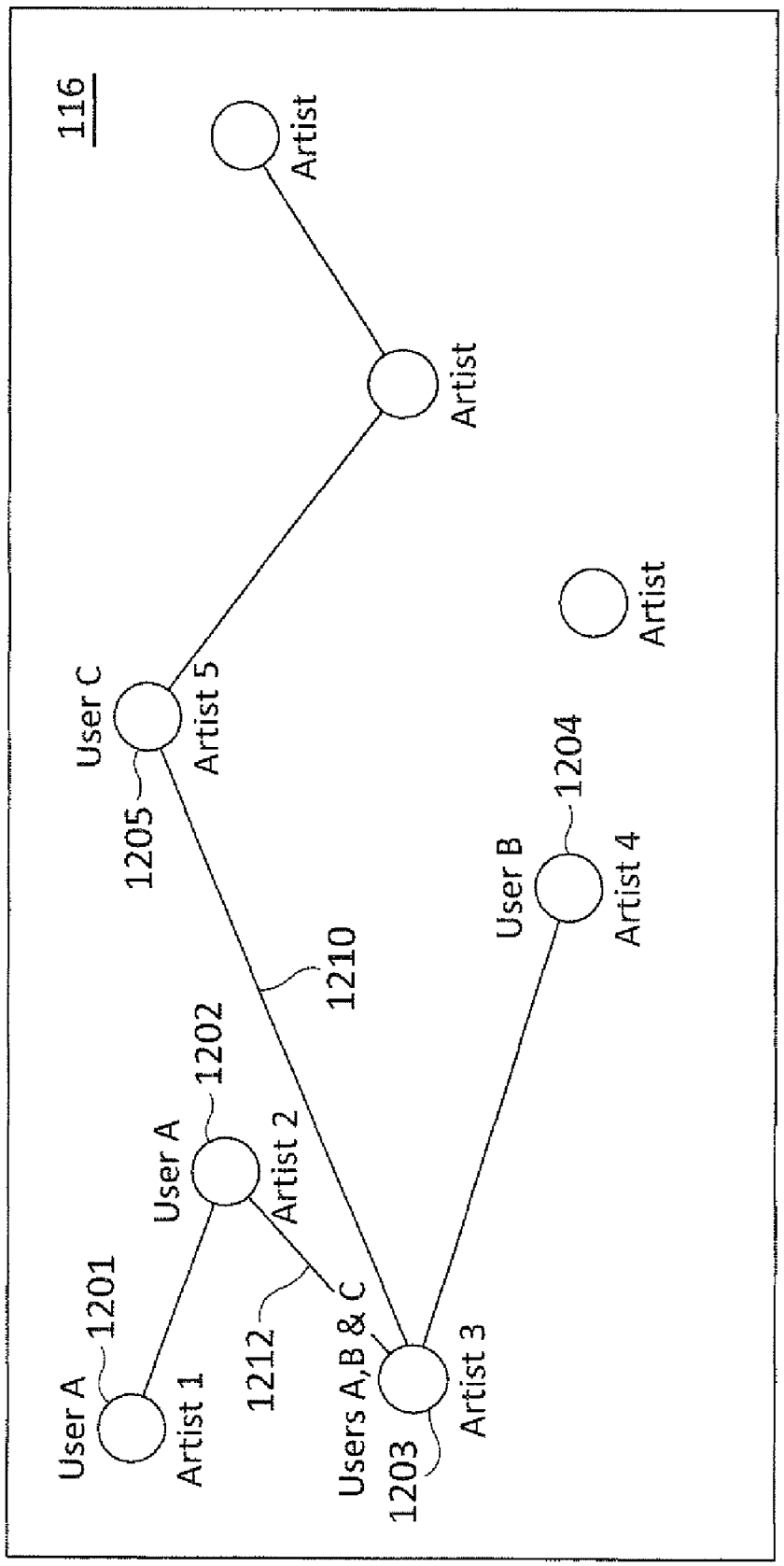

FIG. 12 and FIG. 13 illustrate an embodiment of the applet showing the effect on the graphical display 116 where three different users play a track from the same artist (Artist 3 represented by node 1203) in consecutive order after playing tracks from other artists.

In FIG. 12, nodes 1201 and 1202 are connected via edge 1206 because User A played a track by the artists represented by nodes 1201 and 1202 consecutively. Similarly, nodes 1203 and 1204 are connected via edge 1208 because User B played a track by each represented artist associated with nodes 1203 and 1204 consecutively. Node 1205 is part of another small network of related artist nodes. Node 1205 indicates that User C played a track by Artist 5.

In FIG. 13 depicts display 116 with respect to FIG. 12 after additional tracks are played. Nodes 1202 and 1203 are now connected because User A played a track by Artist 3 (node 1203) after playing a track by Artist 2 (node 1202). Similarly, nodes 1203 and 1205 are now connected because User C played a track by Artist 3 (node 1203) after playing a track by Artist 5 (node 1205). All of the artist nodes in display 116 change position according to the force-directed algorithm described above with the addition of new edges (1210 and 1212) between nodes, created in response to the various user's media consumption.

Figure 14:
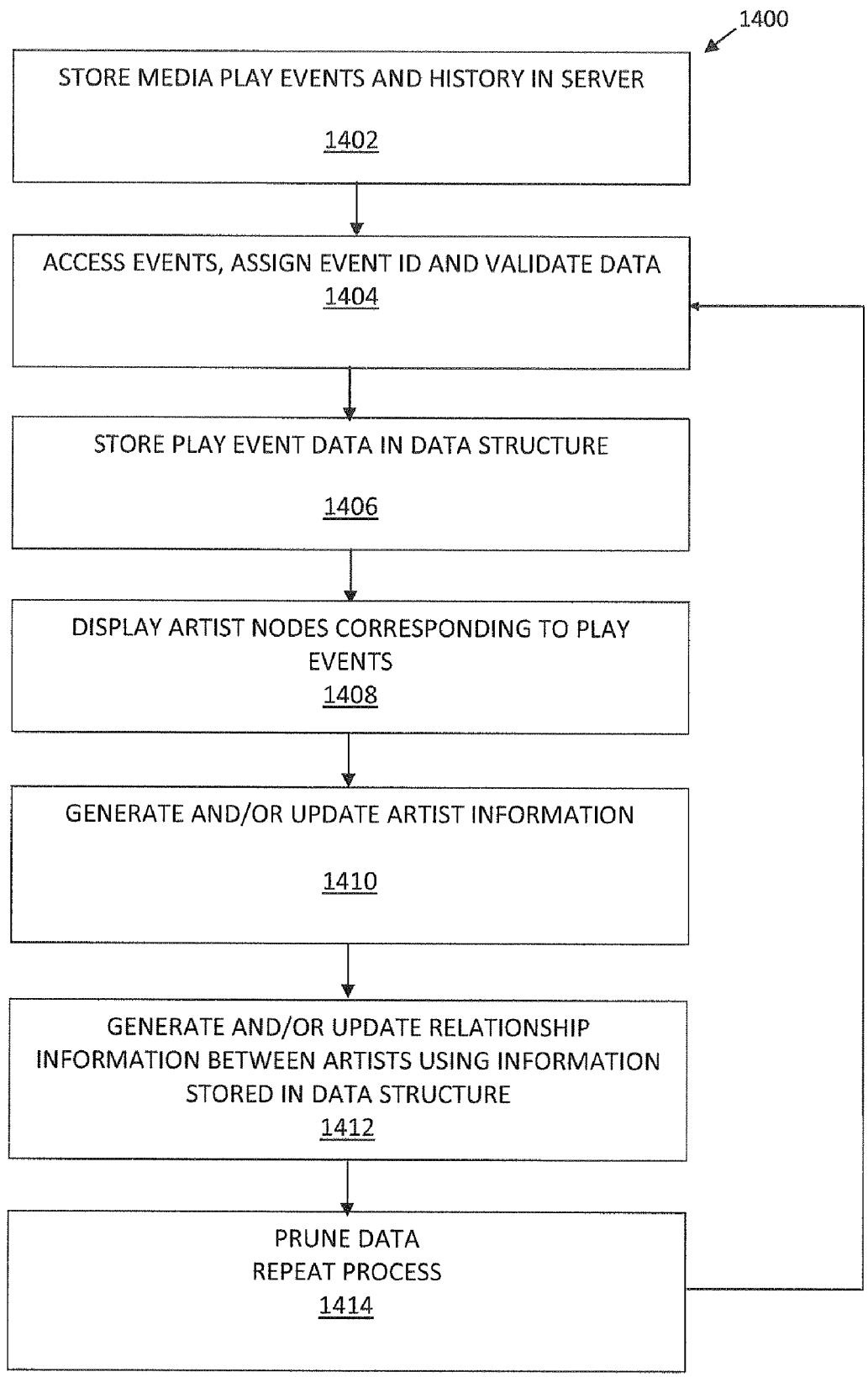
FIG. 14 illustrates an embodiment of a system for managing incoming data.

FIG. 14 is a flow diagram illustrating an embodiment of a process 1400 for managing incoming real-time user consumption data.

At operation 1402 a server stores media item consumption events such as a user's playlists or purchase history.

At operation 1404, an applet accesses information from the server on a continuous basis by polling at regular intervals and deciding which information to keep in the stack using predetermined stack parameters to control the amount of information used by the applet. Alternatively, the server may push information to the applet device. In one embodiment, using a stack of play events may minimize requests for too much information at once from the server and keeps the browser applet from using too much memory in a user's browser.

In one embodiment, upon startup, the applet retrieves a listening history XML document from the server (e.g., requesting the last 20 play events). An example XML document is provided below in Table 1 showing two play events. In Table 1, the first play event starts at line, "-<PlayEventList xmlns="http://www.mystrands.com/xml/2007-05-16">" and ends at line"</PlayEvent>" the second play event starts at line, "-<PlayEvent UserAlias="tvguest" TrackId="11800217" PlayedId="18707321" UserId="90905">" and ends at the next line, "</PlayEvent>." As can be seen in Table 1, entries within the play event boundaries comprise data corresponding to media item consumption.

TABLE 1

XML DOCUMENT

```
<?xml version="1.0" encoding="UTF-8" ?>
- <PlayEventList xmlns="http://www.mystrands.com/xml/2007-05-16">
    - <PlayEvent UserAlias="tvguest" TrackId="7120248" PlayedId="18707322" UserId="90905">
        <BeginTime>1254503737000</BeginTime>
        <EndTime>1254503773000</EndTime>
        <CurrentServerTime>1254503801007</CurrentServerTime>
        <SourceType>0</SourceType>
        <Country>--</Country>
- <User UserId="90905">
        <Email>tvguest@mystrands.com</Email>
            <Alias>tvguest</Alias>
        <isVenue>0</isVenue>
            <ShareProfile>true</ShareProfile>
            <City />
            <State />
            <Country>AD</Country>
        <Gender>0</Gender>
            <Age>37</Age>
            <PostalCode>08036</PostalCode>
            <PhoneNumber />
            <Birthdate>Mon Mar 27 00:00:00 PST 1972</Birthdate>
            <Photo>http://www.mystrands.com/photos/normal/avatar-4.jpg</Photo>
            <ThumbnailPhoto>http://www.mystrands.com/photos/thumb/avatar-4.jpg</ThumbnailPhoto>
            <URI>http://www.mystrands.com/action/MyStrands?target=/tvguest</URI>
    </User>
- <SimpleTrack AlbumId="544027" TrackId="7120248" ArtistId="88022" Catalog="MusicStrands" SourceId="3">
            <ArtistName>Vasco Rossi</ArtistName>
                <AlbumName>Rewind</AlbumName>
                <TrackName>Albachiara</TrackName>
                <URI>http://www.mystrands.com/track/7120248</URI>
        <RmClipURI>http://www.mystrands.com/clip/7120248/RM/7w2d1nb4q10dbz0qt2v455t</RmClipURI>
            <RmMobileClipURI>http://sg1.allmusic.com/cg/smp.dll?link=7w2d1nb4q10dbz0qt2v455t&r=64.ra</RmMobileClipURI>
            <WmaClipURI>http://www.mystrands.com/clip/7120248/WMA/7w2d1nb4q10dbz0qt2v455t</WmaClipURI>
            <CoverURI>http://www.mystrands.com/coverm/3/pop/cov200/dre800/e833/e83337pzrq8.jpg</CoverURI>
            <SmallCoverURI>http://www.mystrands.com/covermt/3/pop/cov75/dre800/e833/e83337pzrq8.jpg</SmallCoverURI>
                <Genre>Rock</Genre>
                <downloadable />
            <UserPurchaseURI>http://www.mystrands.com/track/7120248/getit</UserPurchaseURI>
            </SimpleTrack>
    </PlayEvent>
- <PlayEvent UserAlias="tvguest" TrackId="11800217" PlayedId="18707321" UserId="90905">
        <BeginTime>1254503724000</BeginTime>
        <EndTime>1254503760000</EndTime>
            <CurrentServerTime>1254503801007</CurrentServerTime>
        <SourceType>0</SourceType>
            <Country>--</Country>
    - <User UserId="90905">
            <Email>tvguest@mystrands.com</Email>
            <Alias>tvguest</Alias>
            <isVenue>0</isVenue>
            <ShareProfile>true</ShareProfile>
            <City />
            <State />
            <Country>AD</Country>
        <Gender>0</Gender>
            <Age>37</Age>
            <PostalCode>08036</PostalCode>
            <PhoneNumber />
            <Birthdate>Mon Mar 27 00:00:00 PST 1972</Birthdate>
        <Photo>http://www.mystrands.com/photos/normal/avatar-4.jpg</Photo>
            <ThumbnailPhoto>http://www.mystrands.com/photos/thumb/avatar-4.jpg</ThumbnailPhoto>
            <URI>http://www.mystrands.com/action/MyStrands?target=/tvguest</URI>
            </User>
        - <SimpleTrack AlbumId="1292725" TrackId="11800217" ArtistId="88022" Catalog="MusicStrands" SourceId="3">
                <ArtistName>Vasco Rossi</ArtistName>
                <AlbumName>Tracks</AlbumName>
```

TABLE 1-continued

XML DOCUMENT

```
            <TrackName>Siamo Soli</TrackName>
            <URI>http://www.mystrands.com/track/11800217</URI>
        <RmClipURI>http://www.mystrands.com/clip/11800217/RM/blic6zuc08fhr6f592
omlp0</RmClipURI>
            <RmMobileClipURI>http://sg1.allmusic.com/cg/smp.dll?link=blic6zuc08fhr6f59
2omlp0&r=64.ra</RmMobileClipURI>
            <WmaClipURI>http://www.mystrands.com/clip/11800217/WMA/blic6zuc08fhr6f
592omlp0</WmaClipURI>
            <CoverURI>http://www.mystrands.com/coverm/3/pop/cov200/drf700/f742/f742
35qz9oa.jpg</CoverURI>
            <SmallCoverURI>http://www.mystrands.com/covermt/3/pop/cov75/drf700/f742/
f74235qz9oa.jpg</SmallCoverURI>
                <Genre>Rock</Genre>
                <downloadable />
        <UserPurchaseURI>http://www.mystrands.com/track/11800217/getit</UserPur
chaseURI>
                </SimpleTrack>
    </PlayEvent>
```

The XML document is parsed and individual media item consumption events are retrieved. The media item consumption events in the current embodiment are listening or "play events." However, consumption events may be any recognizable computer mediated event wherein a user accesses a media item or other product or service and claimed subject matter is not limited in this regard.

The listening history document may provide one or more user's playlists or other media item consumption data segmented into play events. Each play event has a corresponding ID. This ID auto-increments, so the highest ID retrieved from a document indicates the latest information retrieved from the server. This number is then saved. If subsequent ID's retrieved from the server are less than or equal to this value, they are ignored. The server may assign the IDs when storing the listening history or the applet may assign IDs based on information in the listening history.

In one embodiment, the applet then checks each play event in the XML document. The applet determines whether the play event has valid information for the artist name and/or other consumption data. In the event the artist name is invalid the applet skips the event.

For example, if the artist name entries are 'n/a', 'various artists', or 'various' they are skipped. In one embodiment, the artist name is trimmed to remove extra whitespace, as well as removing any information contained in parentheses or brackets. This information typically gives track-specific information on artist collaborators, remixes, etc. and may be added and stored in other embodiments. After validation the play event is then added to an event stack.

In one embodiment, the event stack may be set or limited to a predetermined threshold number of play events (e.g., 200 play events). If the stack goes over the threshold, then the oldest events on the stack are removed.

At operation 1406 the media item consumption data associated with the play events is stored in a selected data structure operable to provide a temporal context for the media item consumption data and to indicate correlations between media item consumption data. In one embodiment, the data structure may comprise hash tables which are a very efficient way to correlate events by various attribute. However, other embodiments of data structures may be used and claimed subject matter is not limited in this regard.

In the current embodiment, the applet maintains hash tables (hereinafter 'hash' or 'hashes') for artists, users and tracks that have been played. Anytime a new play event is created, corresponding user and track ID hashes are created/initialized or incremented. These hashes are essentially a tally of all the different events corresponding to a given user or track, and is useful for debugging purposes, as well as for handling data removal/pruning events. The applet generates artist nodes in a display and determines relationships between artists by analyzing the play events. In one embodiment, the play events contain the following media consumption data: user information (who played the track), track information (what track was played) and artist information (who recorded the track). Yet another 'user-last-artist' hash table keeps track of the last artist played by a given user, and is used to trigger the creation of an edge between two artists. In one embodiment, edges are drawn according to known methods and edge data is maintained in a separate hash structure.

For example, if a user "A" plays "Beat it" by "Michael Jackson" the hashes are:
user_hash=>{"A": 1}
track_hash=>{"beat it": 1}
artist_hash=>{"michael jackson":1}

At operation 1408, artist nodes corresponding to play events are displayed. In one embodiment, if a node contains a valid artist, then the applet determines whether that artist has already been played. Each artist is essentially a 'movieclip' object with the ID of the given artist. So, the applet checks the artist hash (e.g., a log of artists with play activity currently maintained by the applet) to find an artist with the given ID. If the artist does not exist, the applet creates a new artist movieclip object and adds it to the applet canvas (applet window). It will update this object with the current album art (if available), as well as update information about the last played track for that artist.

In the current embodiment, if user "A" plays "Beat it" by "Michael Jackson" and Michael Jackson is a new artist in the artist hash, then the applet will display a new node representing "Michael Jackson." In one embodiment, the applet randomly positions the new node in the applet canvas.

At operation 1410, the applet periodically generates or updates artist information using the information stored in the selected data structure.

In one embodiment, if the artist node already exists, the applet increments a corresponding 'event count' counter corresponding to that artist node, updates the track information for the node, and then updates the corresponding hashes for associated tracks and users by either incrementing the respective hash counters for the users and tracks and/or by creating new hash entries for new users and tracks.

The user-last-artist hash is also checked for the current user. If the hash contains a different artist than the current artist (and that artist is still on the display canvas), then an edge is created between the two artists and the user-last-artist hash is updated to the current artist.

For instance, in the current embodiment if there is already a Michael Jackson node displayed by the applet, then when a new play event occurs additional information can be added to the existing node.

When a new play event occurs associated with an already existing Michael Jackson node, the user ID associated with the recent play event, the track played, track meta-data, and a link to the an audio sample of the new track may be added or associated with the node. The new media play event may be user "B" played the track "Thriller" by Michael Jackson. Accordingly, updating will result in the following new set of hashes:
user_hash=>{"A": 1, "B": 1}
track_hash=>{"beat it": 1, "thriller": 1}
artist_hash=>{"michael jackson": 2}

At operation 1412, relationship information between artists may be periodically generated and/or updated using information accessed and stored in the data structure. Such updates may be executed at predetermined intervals, periodically and/or in response to some triggering event such as recognition of a new play event.

Continuing with the example above, an update may indicate, user "A" played the track "Jumping Jack Flash" by the Rolling Stones. The updated hashes in this update are:
user_hash=>{"A": 2, "B": 1}
track_hash=>{"beat it": 1, "thriller": 1, "jumpin jack flash": 1}
artist_hash=>{"michael jackson":2, "rolling stones":1}

Here, if the display canvas does not contain a Rolling Stones node, a new artist node is created and displayed for the Rolling Stones. Additionally, because user "A" played a Michael Jackson track and then the Rolling Stones track consecutively, an edge is added in the display canvas connecting Michael Jackson and the Rolling Stones to show the correlation between them.

In one embodiment, an edge may be added using the following last_artist hash:
user_la_hash=>{"A":"michael jackson", "B":"michael jackson"}
which keeps track of what the "last artist" was for each user.

Using this last_artist hash the applet links the two artists Michael Jackson and the Rolling Stones in the real-time user consumption visualization display. Afterwards, the hash for user "A" is updated to:
user_la_hash=>{"A": "rolling stones", "A": "michael jackon"}

In one embodiment, a graph edge canvas is created underneath the current node canvas. The current position of the corresponding node ID's are resolved, and a line is drawn between them.

At operation 1414, the system prunes old or stale data and cycles back to operation 1404. Accordingly, the visualization display adds nodes until it reaches some limit (e.g, 100 nodes) and then begins to remove old data.

The applet determines which hashes contain the oldest information by identifying the oldest event in the event stack and removing it from the event stack as well as decrementing counters in the hashes associated with consumption data corresponding to the oldest event. Identifying the oldest event can be done by a variety of methods, such as, for instance a first in first out (FIFO) method. In one embodiment, the event stack is a simply a queue of events. New events get put on the "top" of the stack. If the stack gets too big, then the event on the "bottom" of the stack is the oldest and in some embodiments is selected for removal.

The applet removes the oldest event and updates the hashes on the basis of the track/artist/user ID associated with the event. In one embodiment, the applet decrements the counters by a predetermined amount for the stored data associated with the oldest event such as user, track, and artist hashes. If any of the counters for the decremented hashes goes to zero, then it is inferred that the information related to that zero hash's user/track/artist is stale as well and the visualization no longer needs the related information. In this instance, the applet deletes the old entry that decremented to zero as well as all the related information (such as audio samples of tracks, album art, user profile, web page links, etc.).

When the oldest event is deleted from the event stack, action may be taken by the applet to update the hashes and remove old data. For instance, if when decrementing the track hash counter for the track ID corresponding to the oldest it goes to zero, then the applet deletes the track ID from the hash. However, if when decrementing the user hash counter for the user ID corresponding to the oldest event it goes to zero, then the applet deletes it as well as the user-last-artist hash entry. If when decrementing the artist hash counter for the artist ID corresponding to the oldest event it goes to zero, then the applet goes through and resolves its list of neighbors into a list of edge ID's (by sorting them, then looking them up in the edge hash). Then, the applet removes each of the edge id's from the graph, and then removes the artist node from the graph.

In one embodiment, visualization of such data enables users to see emergent, strongly related artists (or in other embodiments related products or services). Sometimes the relationships are "idiosyncratic", such as a person who plays tracks by "Metallica" right after playing tracks by "Brittney Spears." However, usually the connections between media item consumption events (or other computer mediated consumption items) are meaningful and users can draw inferences about the media items, products or services based on the determined connections between the products/service/media items.

Figure 15:
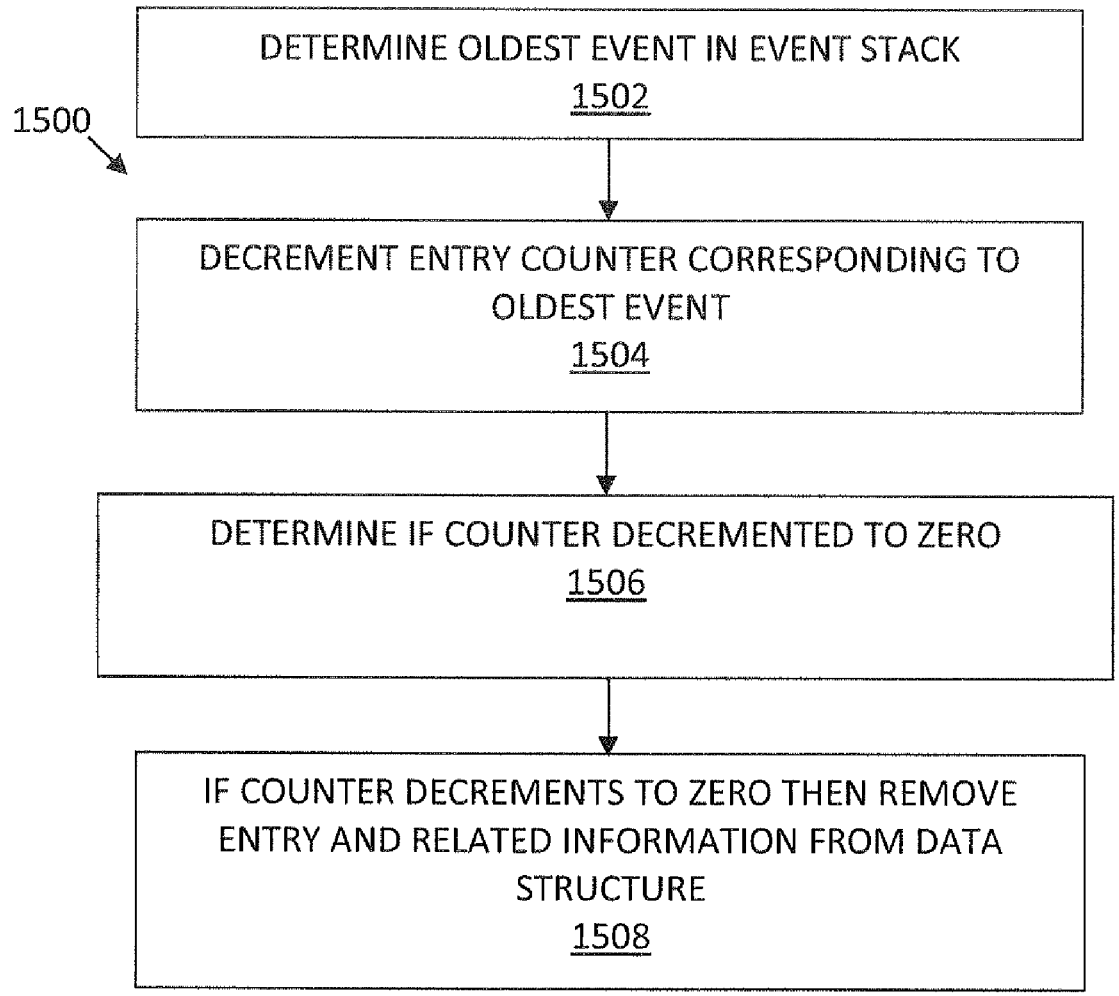
FIG. 15 illustrates an embodiment of a system for removing stale data from a real-time user consumption event stack.

FIG. 15 illustrates a process 1500 for decrementing real-time user consumption data structures. Several disparate data structures may be created when new events are introduced to the applet. Therefore, in one embodiment, when an old event is removed from an event stack it is helpful to also remove all the related items from the data structure and visualization as well.

The process begins at operation 1502, where the applet determines which event is the oldest event in an event stack.

At operation 1504, the applet decrements counter(s) in a data structure corresponding to information related to the oldest event by a predetermined amount (e.g., 1).

At operation 1506, the applet determines if any counter decrements to zero. At operation 1508, if a counter decrements to zero, the applet removes the corresponding related information from the data structure and visualization. When a counter decrements to zero, the applet may infer that the entry in the data structure and any related entry is stale and no longer needed for accurate real-time visualization of user consumption behavior. This method of removing information allows the graph to be deleted fluidly in real-time. However, other methods of removing old or unwanted information may be employed and claimed subject matter is not limited in this regard. For instance, in another embodiment, a user may manually remove nodes from the visualization applet for instance, by pressing a key to delete a currently selected node.

Figure 16:
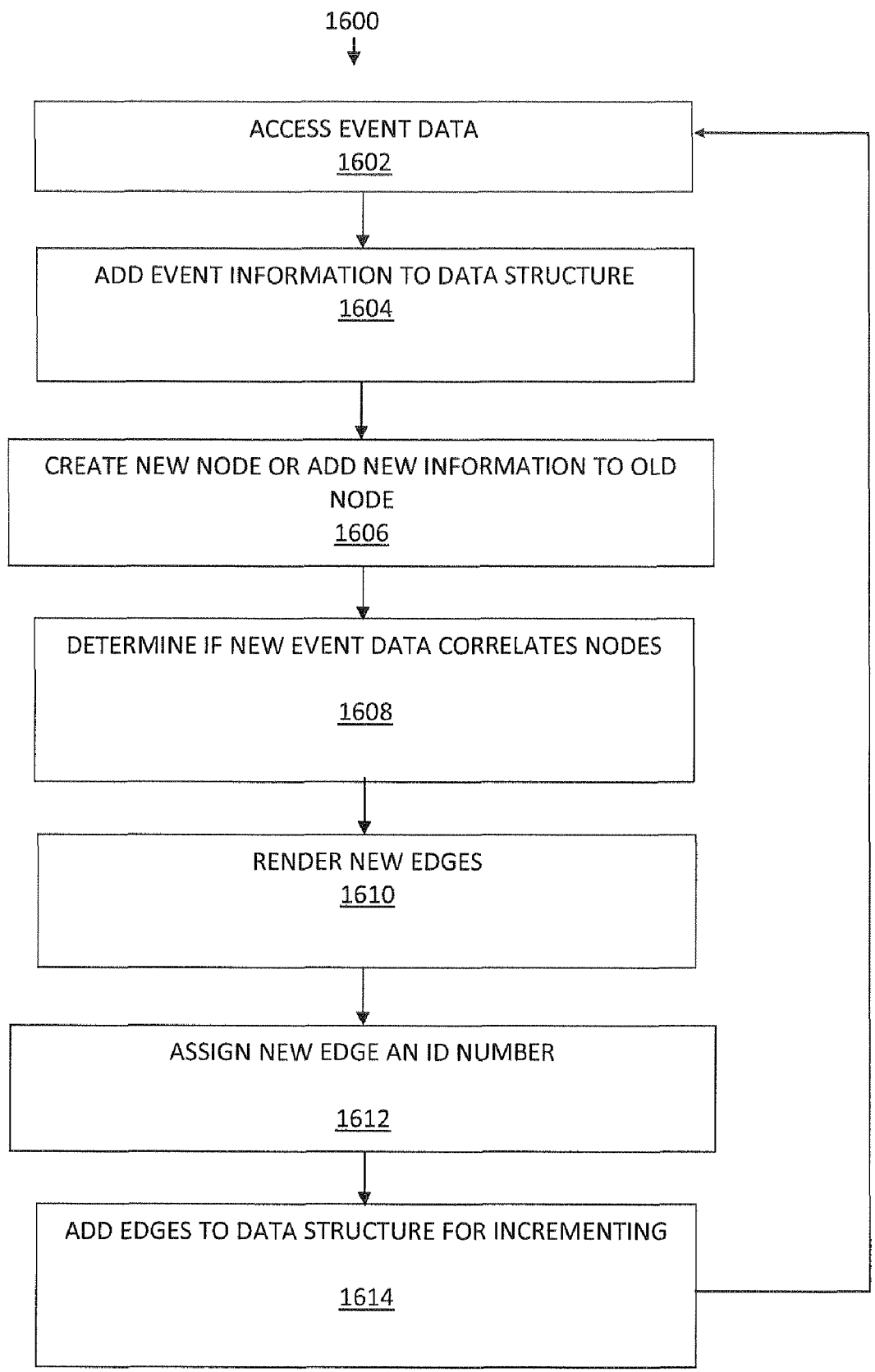
FIG. 16 illustrates an embodiment of a system for creating edges between nodes in a real-time user consumption network visualization applet.

FIG. 16 illustrates an embodiment of a process 1600 for creating edges between graphical nodes representing subjects of real-time user consumption data. The nodes are displayed and graphically connected, for instance with a line, to show that certain nodes are related. Characteristics of relationships between nodes may be indicated by varying the edge's weight (line weight) to illustrate, for instance, strength or weakness of correlations between nodes. Additionally, edges in a particular applet display may be normalized with respect to each other based on whether the edge's weights are similar/dissimilar.

At operation 1602, the system accesses real-time user consumption event data. In one embodiment, the real-time user consumption data may be retrieved from a server that stores data related to media item listening events. The real-time user consumption data may be associated with user consumption behaviors such as purchase, play, skip, artist, track, user send/receive, sign, download and/or trade. In other embodiments, any product or service available via a network may be the subject of the real-time user consumption data where accessing the product or service produces an event recognizable by a computer.

At operation 1604, the system adds real-time user consumption event data to a selected data structure for storing and correlating subjects of the real-time user consumption event data.

At operation 1606, the system determines the real-time user consumption event data is new and creates a new node to display unrepresented subjects of the new real-time user consumption event data or adds information to an existing node if the new real-time user consumption event data does not define a new node. At operation 1608, the system determines if the new event data correlates two or more nodes. If there is a new correlation between two nodes a new edge is generated.

A correlation between nodes may be determined based on a variety of correlation techniques. For instance, in the current embodiment each node keeps track of neighboring nodes directly through their own unique "neighbor" correlation data structure (e.g., a neighbor hash). In one embodiment, neighbors are nodes that are connected by one or more edges. The "neighbor" correlation data structure tracks consecutive plays of various artist tracks by various users. A correlation edge is generated when tracks by different artists are played consecutively.

At operation 1610, if the correlation between nodes exists then the system draws an edge graphic between correlated nodes. In one embodiment, the edges are rendered as primitive lines using a Flash drawing API.

At operation 1612, the system assigns a new edge an ID number equal to respective concatenated node IDs. Since the network model is undirected, the node ID's are sorted numerically first, then concatenated and delimited and thus a unique edge ID can be assigned to each new edge. For example, concatenated node IDs for node ID#1=ABC, node ID#2=DEF would be unique edge ID ABC-DEF. In one embodiment, node IDs are sorted before concatenating, to enable assignment of a unique ID per edge between two arbitrary nodes regardless of ordering.

At operation 1614, the system adds edges to the data structure for incrementing. In one embodiment, the edge ID's are loaded into a hash, which is also incremented and decremented like the user and track hashes described above with reference to FIG. 14.

In one embodiment, a function iterates over all the edge ID's in the edge data structure (e.g., an edge hash). At the start of a next render loop, the graph edge canvas is cleared. Then the process repeats returning to operation 1602.

It will be obvious to those having skill in the art that many changes may be made to the details of the above-described embodiments without departing from the underlying principles of the disclosed technology. The scope of the present disclosed technology should, therefore, be determined only by the following claims.

I claim:

1. A computer implemented method for displaying real-time computer mediated user consumption data, comprising:
    accessing media item listening behavior corresponding to real-time computer mediated user media item listening behavior;
    parsing the media item listening behavior to identify one or more play events comprising one or more instances of media item listening behavior and wherein each play event is associated with a user, and wherein play events comprise instances of media items associated with the user being purchased, played, replayed, tagged, and skipped;
    adding the play events to an event stack comprising a predetermined stack limit;
    storing the media item listening behavior for each play event in a data structure comprising a plurality of hash tables for identifying and tracking media item attributes including: artists, users, tracks played, user last tracks played, correlations between different artists with respect to users' listening activity and temporal context of the users' listening activity, the data structure configured to correlate related media item listening behavior and to provide a temporal context to the stored media item listening behavior;
    displaying a visualization of the play events responsive to the arrangement of the media item listening behavior in the data structure, wherein displaying comprises:
        adding a plurality of nodes representing artists and a plurality of edges representing consecutive play events of the same artist, each edge connecting a first node of the plurality of nodes to a second node of the plurality of nodes correlated to the first node, each of the plurality of nodes assigned a velocity, a position, a net force, and an identifier associated with one or more media items, and each of the plurality of edges assigned a net spring force;
        applying a damping factor; and
        repeatedly updating the position of each of the plurality of nodes based at least on the net force and the velocity assigned to each of the plurality of nodes, the net spring force assigned to each of the plurality of edges, and the damping factor until the position for each of the plurality of nodes reaches an equilibrium; and
    updating the visualization display responsive to each change in the artists, users, tracks played, user last tracks played, correlations between different artists with respect to users' listening activity and temporal context of the users' listening activity.

2. The computer implemented method of claim 1, further comprising:
    associating one or more counters with the media item listening behavior in the data structure;
    incrementing the counters upon adding the media item listening behavior to the data structure;
    identifying and removing an oldest play event from the event stack after the predetermined stack limit is exceeded;

decrementing the counters responsive to removing the oldest play event from the event stack; and removing the media item listening behavior from the data structure when an associated counter decrements to zero.

3. The computer implemented method of claim 2, wherein removing the oldest play event from the event stack further comprises selectively pruning media item listening behavior from the data structure by decrementing the counters for media item listening behavior associated with the oldest play event and removing media item listening behavior from the data structure corresponding to counters that are decremented to zero.

4. The computer implemented method of claim 1, wherein the edge data is configured for incrementing and decrementing counters associated with the edge data in the data structure.

5. The computer implemented method of claim 1, further comprising:

extracting and validating meta-data related to consumption data for a particular event;

storing the meta-data in the data structure in association with the related consumption data; and periodically updating the meta-data.

6. A non-transitory machine-readable storage medium comprising instructions which, when executed, cause the machine to:

access a series of play events comprising real-time media item listening behavior, wherein the play events are associated with a user and a unique sequential identifier, wherein play events comprise instances of media items associated with the user being purchased, played, replayed, tagged, and skipped;

compare the play event identifiers to previously retrieved play event identifiers to determine whether the play events are new;

store one or more new play events in an event stack wherein the event stack has a predetermine stack limit;

arrange real-time media item listening behavior corresponding to the new play events in one or more data structures, wherein the data structures are configured to correlate real-time media item listening behavior and to maintain a temporal context for real-time media item listening behavior;

increment counters in the data structure associated with the arranged real-time media item listening behavior upon addition of the real-time media item listening behavior to the data structure, wherein the data structure comprises a plurality of hash tables for identifying and tracking media item attributes including: artist, users, tracks played, user last track played, correlations between different artists with respect to users' listening activity and temporal context of the users' listening activity;

display a visualization of the arranged real-time media item listening behavior responsive to the arrangement of the real-time media item listening behavior in the data structure, wherein displaying comprises:

adding a plurality of nodes representing artists and a plurality of edges representing consecutive play events of the same artist, each edge connecting a first node of the plurality of nodes to a second node of the plurality of nodes correlated to the first node, each of the plurality of nodes assigned a velocity, a position, a net force, and an identifier associated with one or more media items, and each of the plurality of edges assigned a net spring force;

applying a damping factor; and repeatedly updating the position of each of the plurality of nodes based at least on the net force and the velocity assigned to each of the plurality of nodes, the net spring force assigned to each of the plurality of edges, and the damping factor until the position for each of the plurality of nodes reaches an equilibrium;

identify and remove an old event from the event stack responsive to the event stack exceeding the predetermined stack limit;

decrement counters in the data structure associated with the arranged real-time media item listening behavior upon removal of the old event from the event stack wherein the old event corresponds to the arranged real-time media item listening behavior that is scheduled to be decremented; and update the visualization display responsive to each change in the artists, users, tracks played, user last tracks played, correlations between different artists with respect to users' listening activity and temporal context of the users' listening activity.

7. The tangible machine-readable storage medium of claim 6 comprising further instructions which, when executed, cause the machine to determine the oldest event in the stack according to a first in first out method.

8. The tangible machine-readable storage medium of claim 6 comprising further instructions which, when executed, cause the machine to remove arranged real-time media item listening behavior from the data structure when the counter associated with the arranged real-time media item listening behavior is decremented to zero.

9. The tangible machine-readable storage medium of claim 6, wherein the data structure correlates arranged real-time media item listening behavior and stores an indication of the correlation as a separate entry in the data structure and wherein the correlation entry is associated with a counters for incrementing and decrementing.

10. The tangible machine-readable storage medium of claim 6 comprising instructions which, when executed, further cause the machine to:

validate meta-data associated with the new event;

store the meta-data in the data structure; and update the meta-data as additional new events are accessed comprising corresponding meta-data.

\* \* \* \* \*